(12) United States Patent  (10) Patent No.: US 11,089,312 B2
Jang et al.  (45) Date of Patent: Aug. 10, 2021

(54) METHOD FOR PROCESSING IMAGE AND APPARATUS THEREFOR

(71) Applicant: LG ELECTRONICS INC., Seoul (KR)

(72) Inventors: Hyeongmoon Jang, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 16/323,488

(22) PCT Filed: Aug. 8, 2017

(86) PCT No.: PCT/KR2017/008541
§ 371 (c)(1),
(2) Date: Feb. 5, 2019

(87) PCT Pub. No.: WO2018/030746
PCT Pub. Date: Feb. 15, 2018

(65) Prior Publication Data
US 2021/0021840 A1   Jan. 21, 2021

Related U.S. Application Data

(60) Provisional application No. 62/372,267, filed on Aug. 8, 2016.

(51) Int. Cl.
H04N 19/174 (2014.01)
H04N 19/122 (2014.01)
H04N 19/176 (2014.01)
H04N 19/64 (2014.01)
H04N 19/70 (2014.01)
(Continued)

(52) U.S. Cl.
CPC ............. *H04N 19/174* (2014.11); *G06T 9/40* (2013.01); *H04N 19/122* (2014.11); *H04N 19/176* (2014.11); *H04N 19/64* (2014.11); *H04N 19/70* (2014.11); *H04N 19/96* (2014.11)

(58) Field of Classification Search
None
See application file for complete search history.

(56) References Cited

U.S. PATENT DOCUMENTS

2013/0107950 A1* 5/2013 Guo ................... H04N 19/122
375/240.12
2019/0313096 A1* 10/2019 An .......................... H04N 19/96

FOREIGN PATENT DOCUMENTS

KR   10-1519557 B1   5/2015
KR   10-1617109 B1   4/2016
(Continued)

Primary Examiner — Christopher Braniff
(74) Attorney, Agent, or Firm — Dentons US LLP

(57) ABSTRACT

The present invention relates to an image processing method and an apparatus therefor. Specifically, a method for decoding an image may comprise the steps of: decoding a first split flag indicating whether to split a first block using a binary tree structure; when the first split flag indicates that the first block is split, decoding split mode information indicating the direction in which the first block is split; checking whether a second block split from the first block is a square block, according to the split mode information; and when, as a result of the checking, it is determined that the second block is a square block, decoding a second split flag indicating whether to split the second block using a quad tree structure.

9 Claims, 33 Drawing Sheets

(51) Int. Cl.
*H04N 19/96* (2014.01)
*G06T 9/40* (2006.01)

(56) References Cited

FOREIGN PATENT DOCUMENTS

| WO | 2014/120369 A1 | 8/2014 |
| WO | 2015/169207 A1 | 11/2015 |
| WO | 2016/091161 A1 | 6/2016 |

* cited by examiner

[Fig. 1]
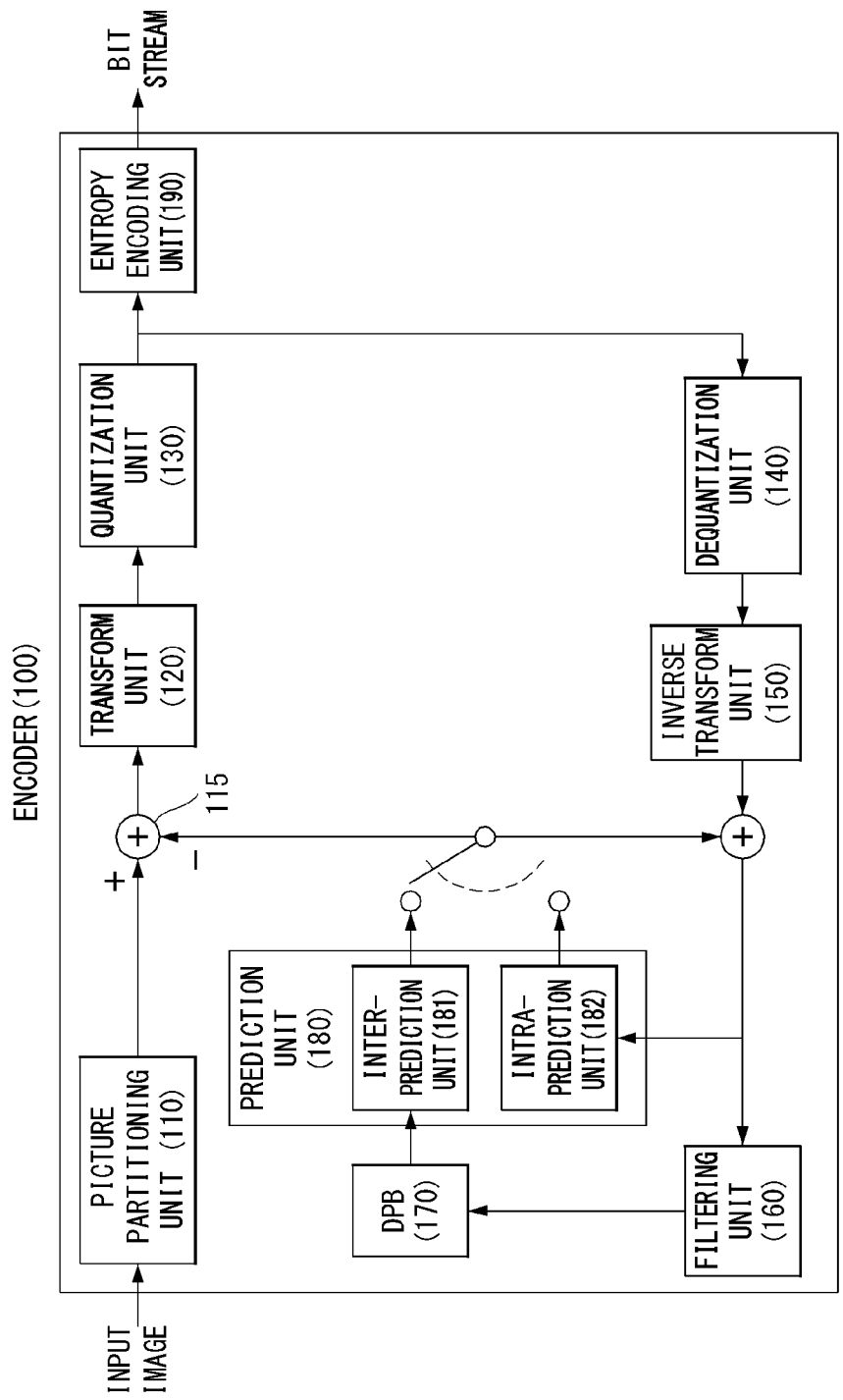

[Fig. 2]
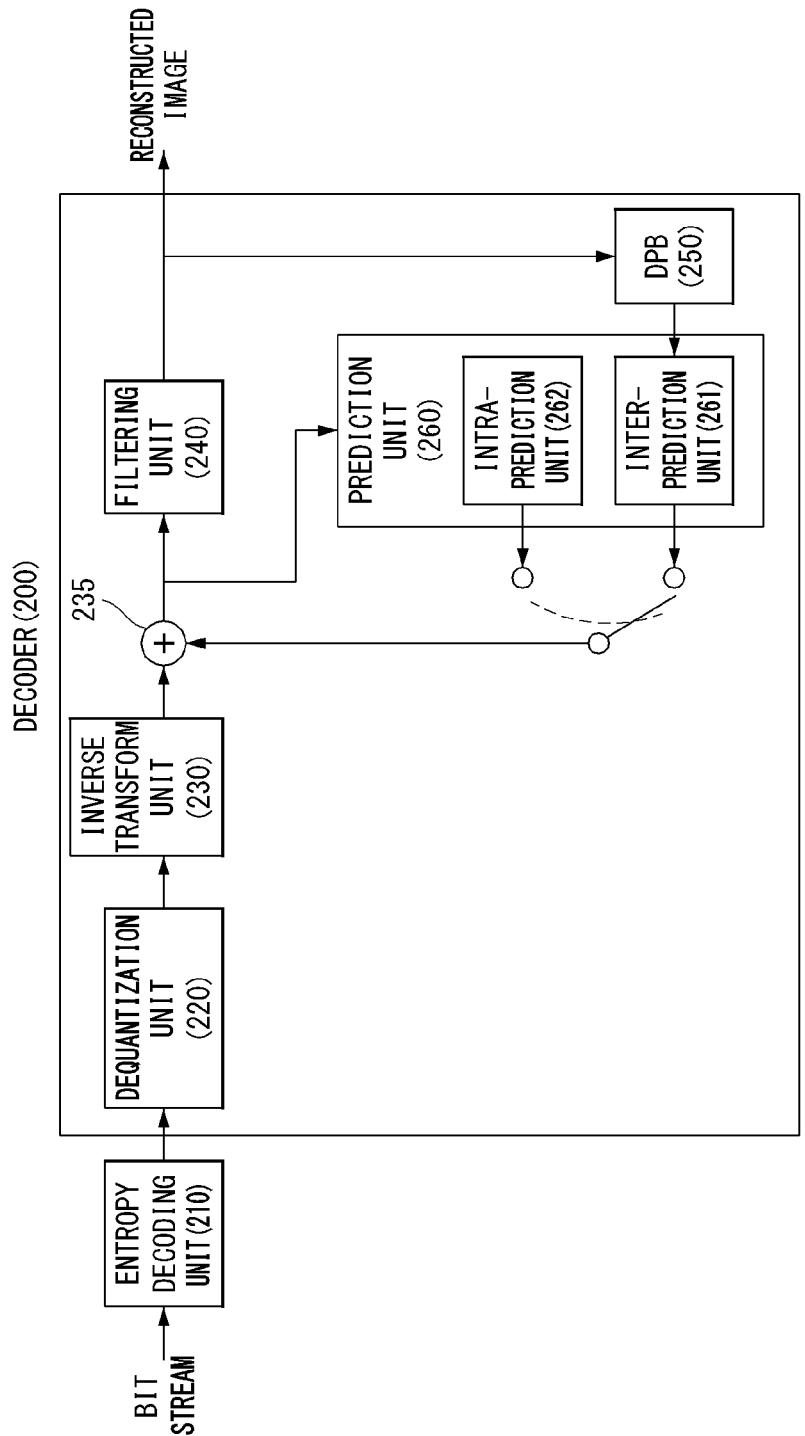

[Fig. 3]
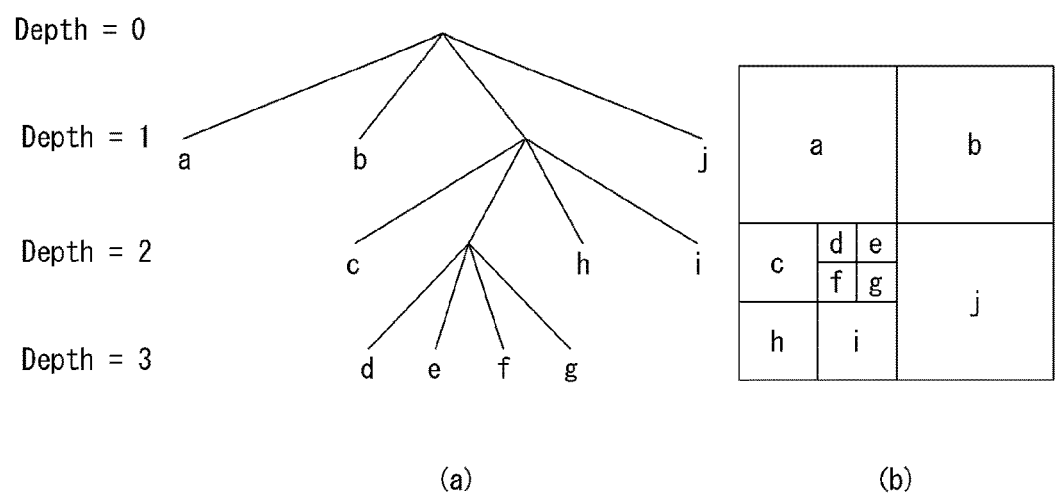

[Fig. 4]
Intra:
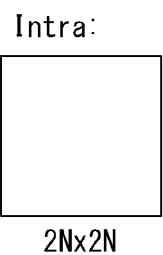 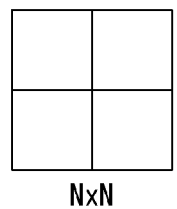
2Nx2N  NxN
Inter:
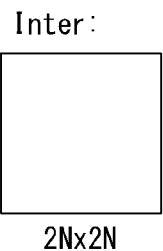 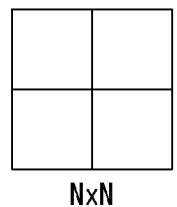 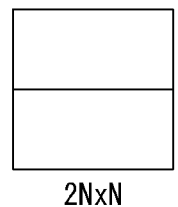 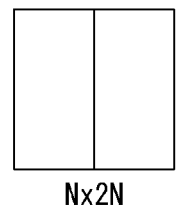
2Nx2N  NxN  2NxN  Nx2N
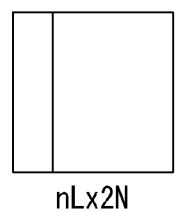 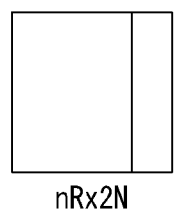 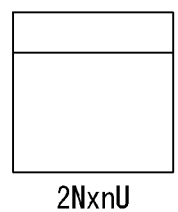 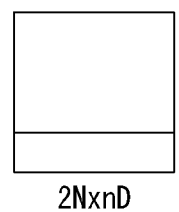
nLx2N  nRx2N  2NxnU  2NxnD

[Fig. 5]
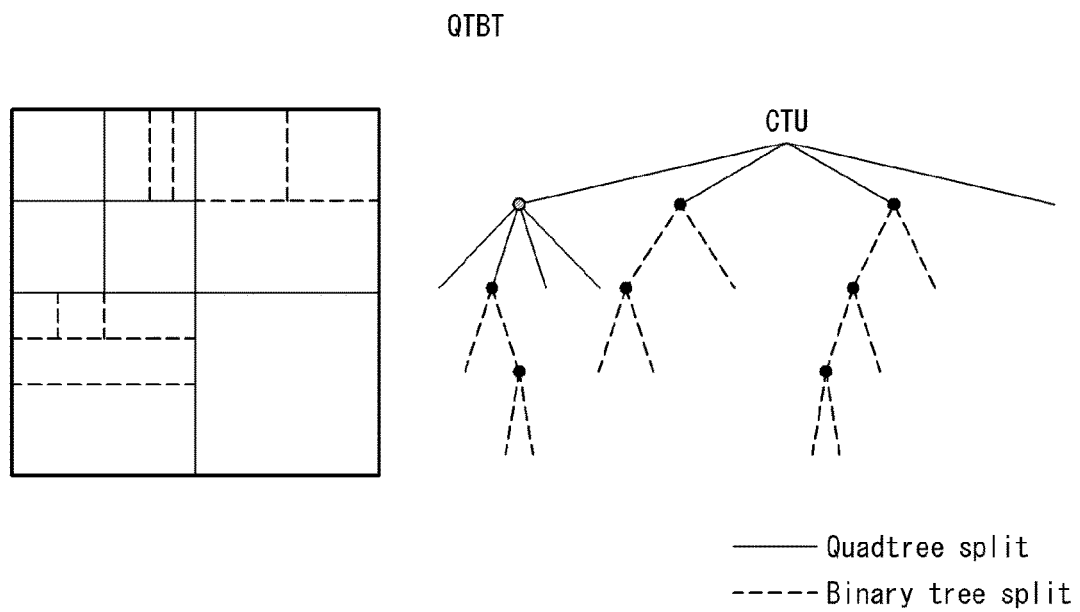

[Fig. 6]
HEVC
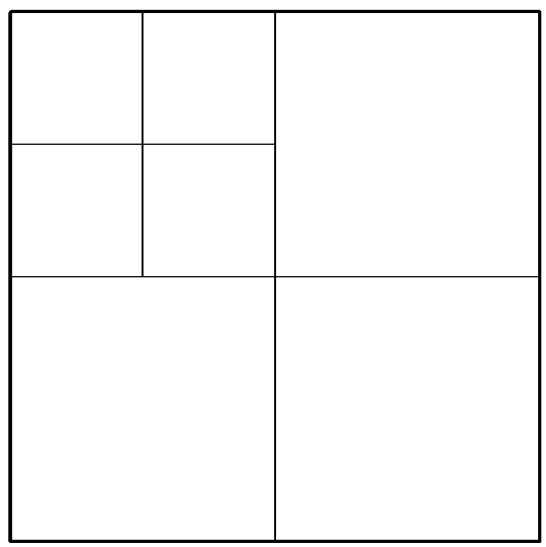
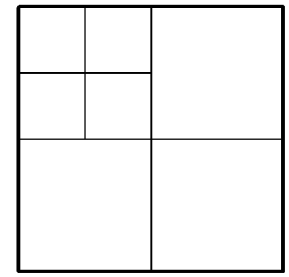
(a) Luma  (b) Chroma

[Fig. 7]
QTBT I-Slice
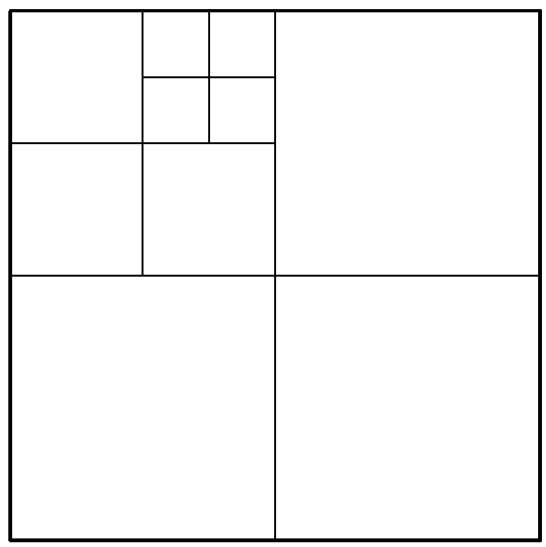
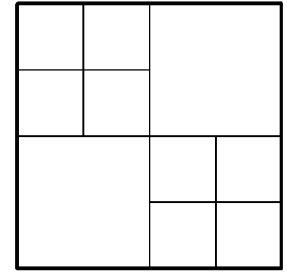
(a) Luma       (b) Chroma

[Fig. 8]
QTBT non-I-slide
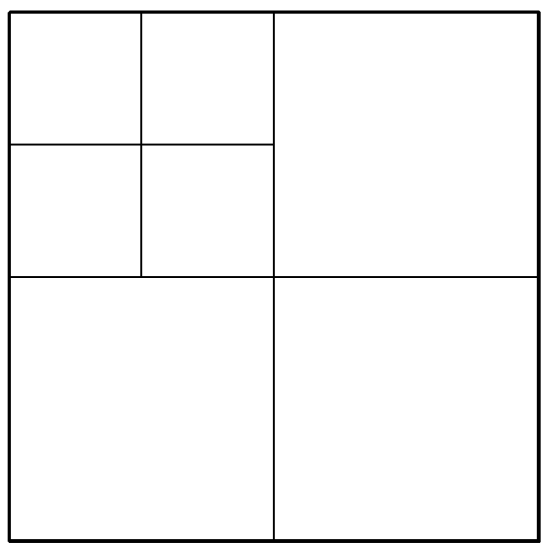
(a) Luma
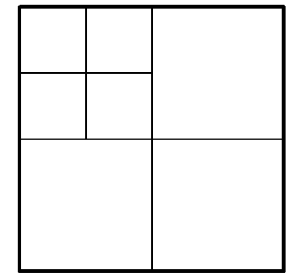
(b) Chroma

[Fig. 9]
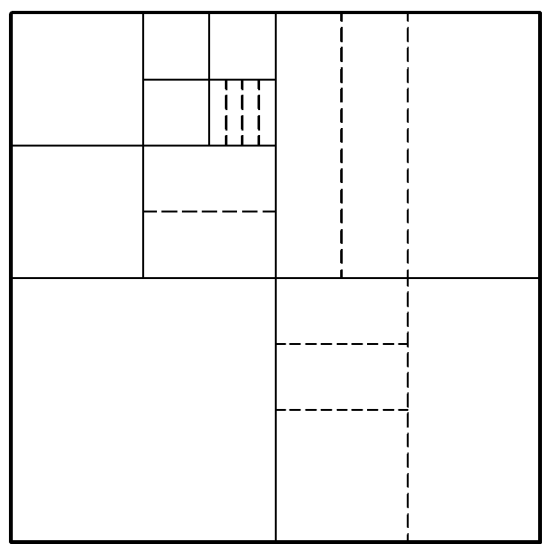   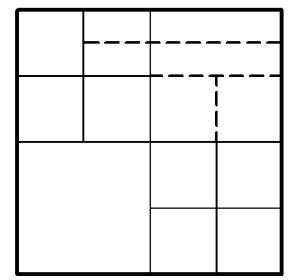
(a) Luma   (b) Chroma

[Fig. 10]
QTBT binary tree split mode
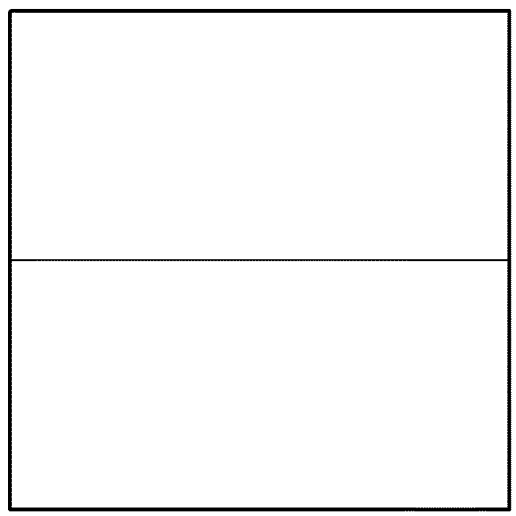
(a)
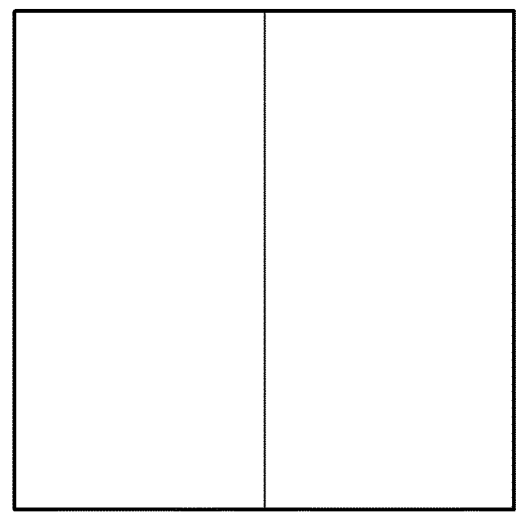
(b)

[Fig. 11]
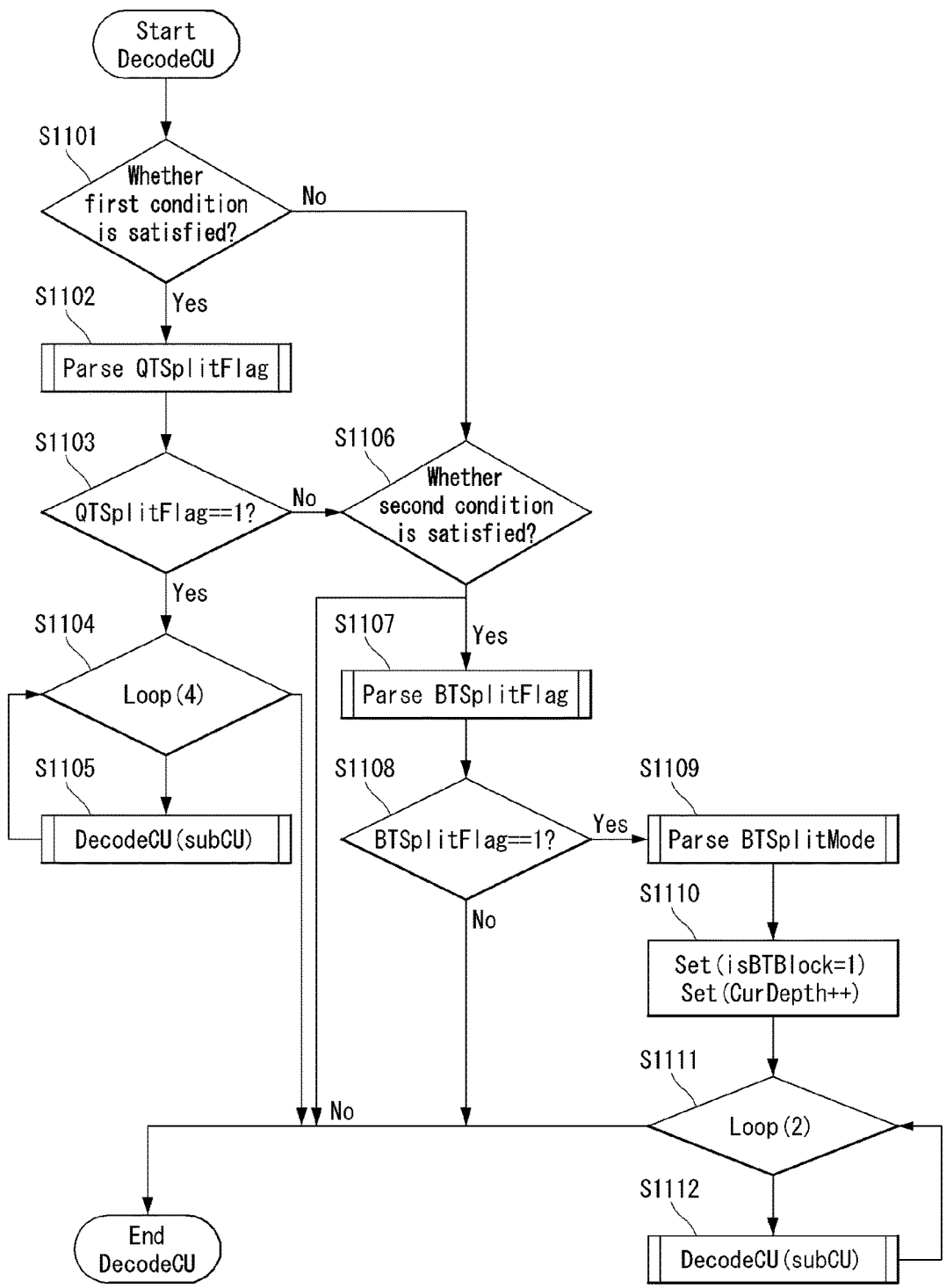

[Fig. 12]
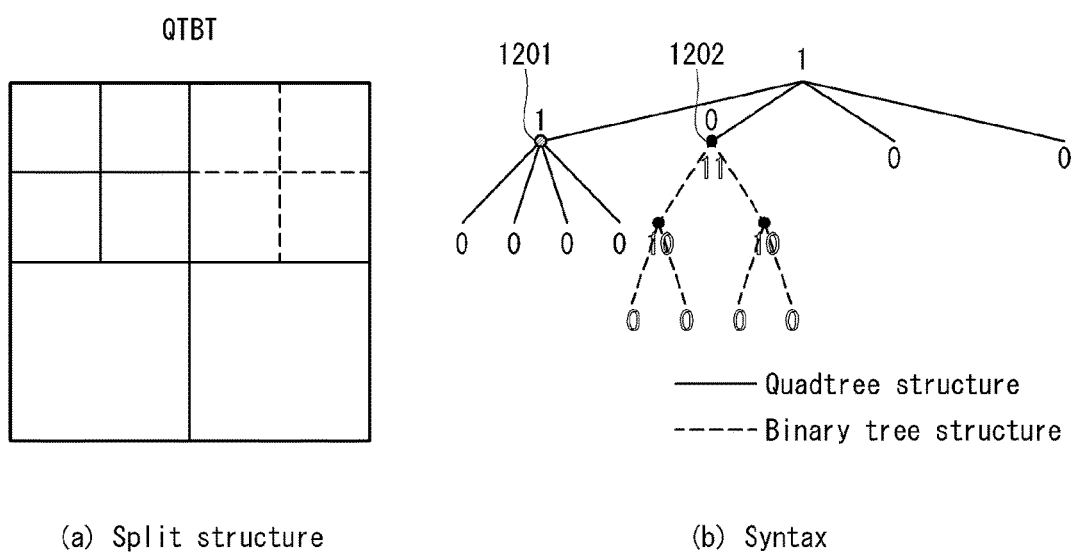
(a) Split structure
(b) Syntax

[Fig. 13]
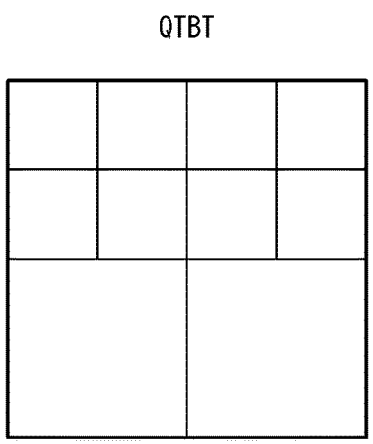
(a) Split structure
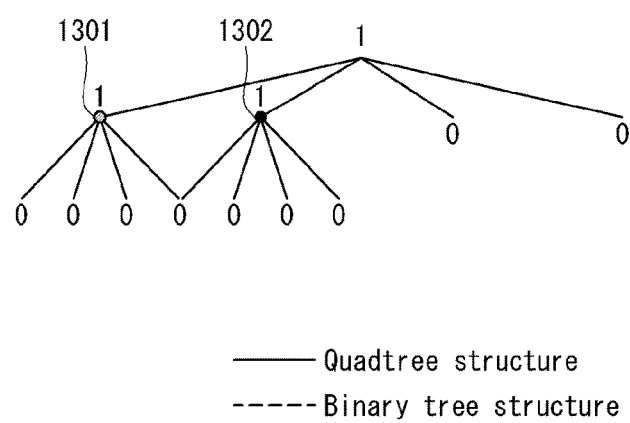
(b) Syntax

[Fig. 14]
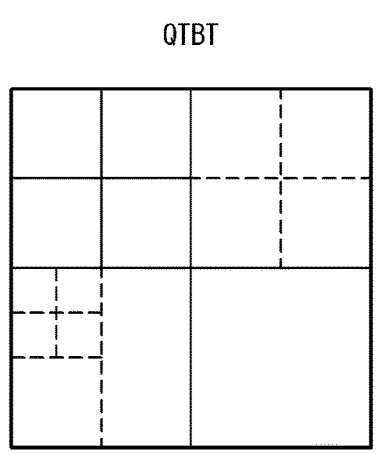
QTBT
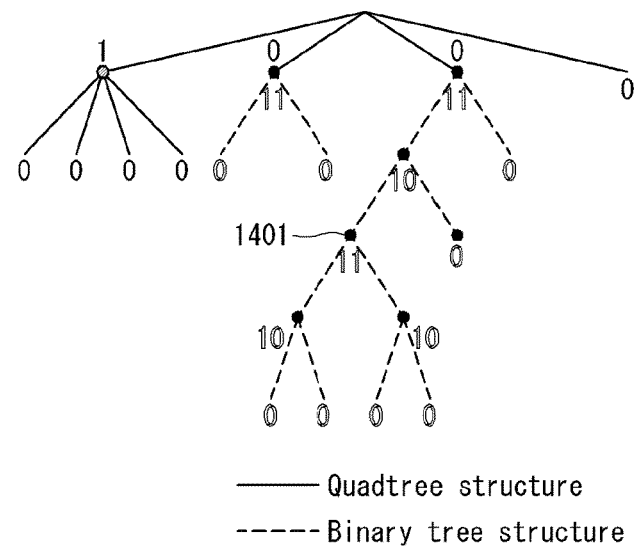
——— Quadtree structure
- - - - Binary tree structure
(a) Split structure  (b) Syntax

[Fig. 15]
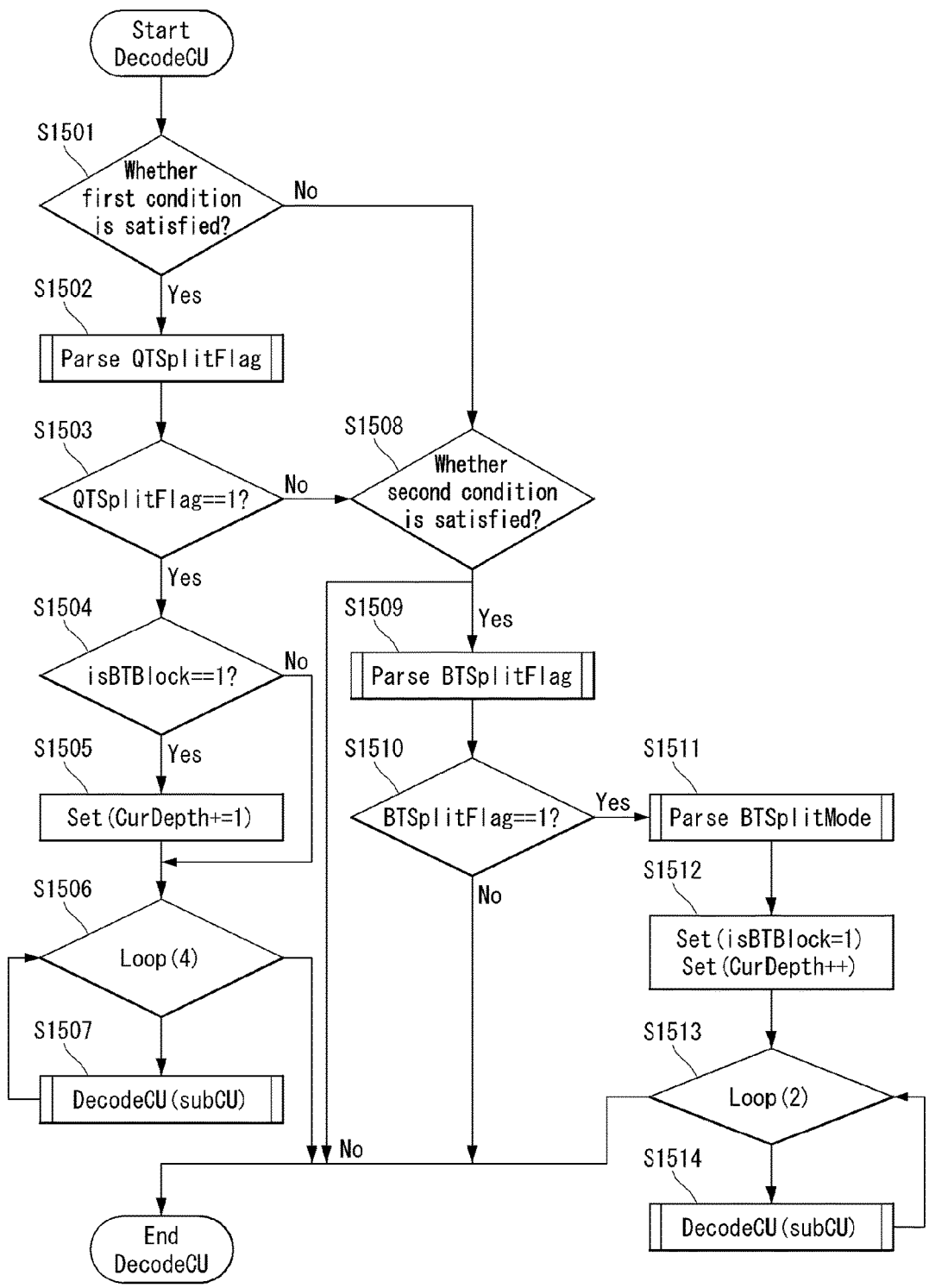

[Fig. 16]
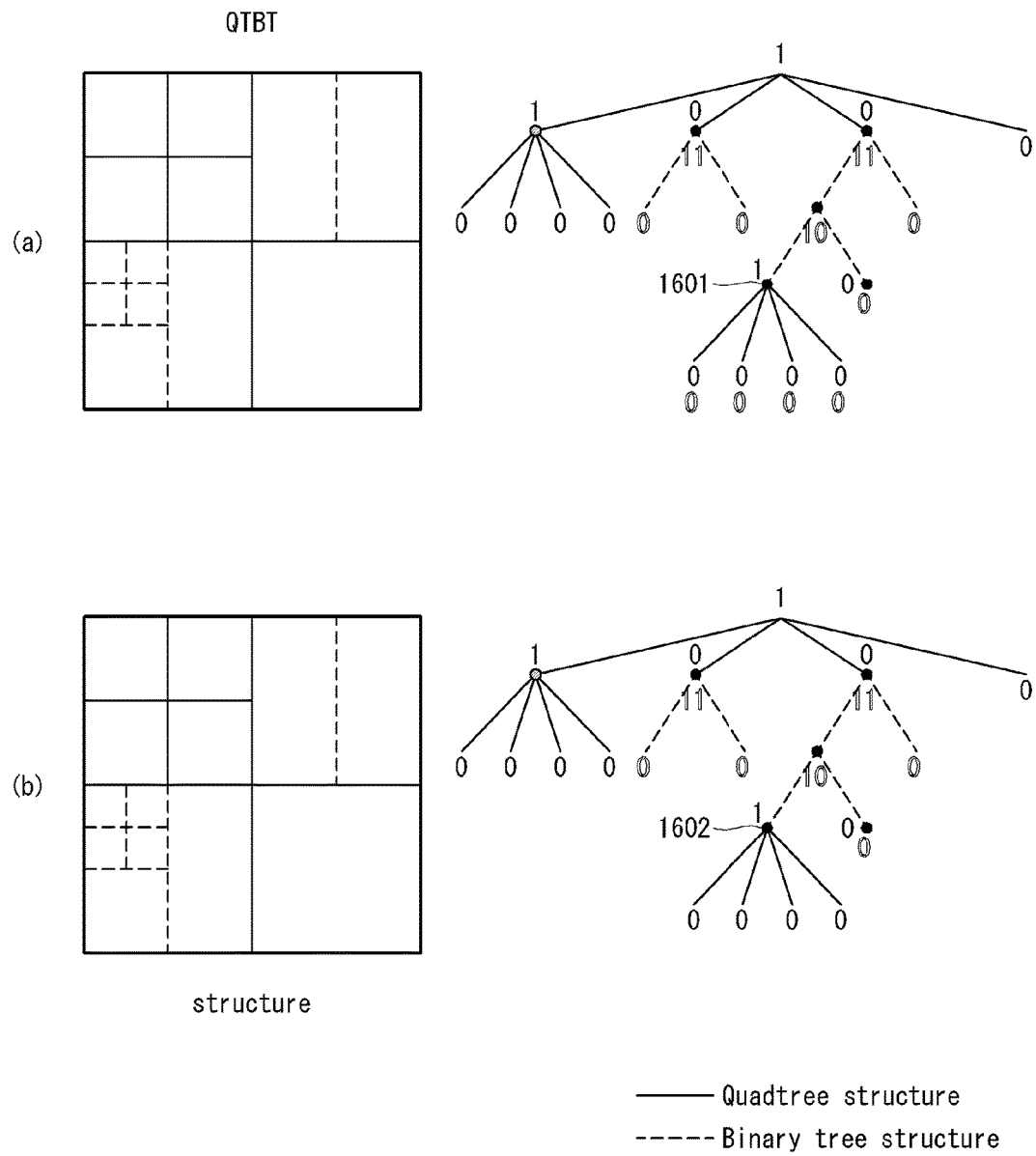
structure

[Fig. 17]
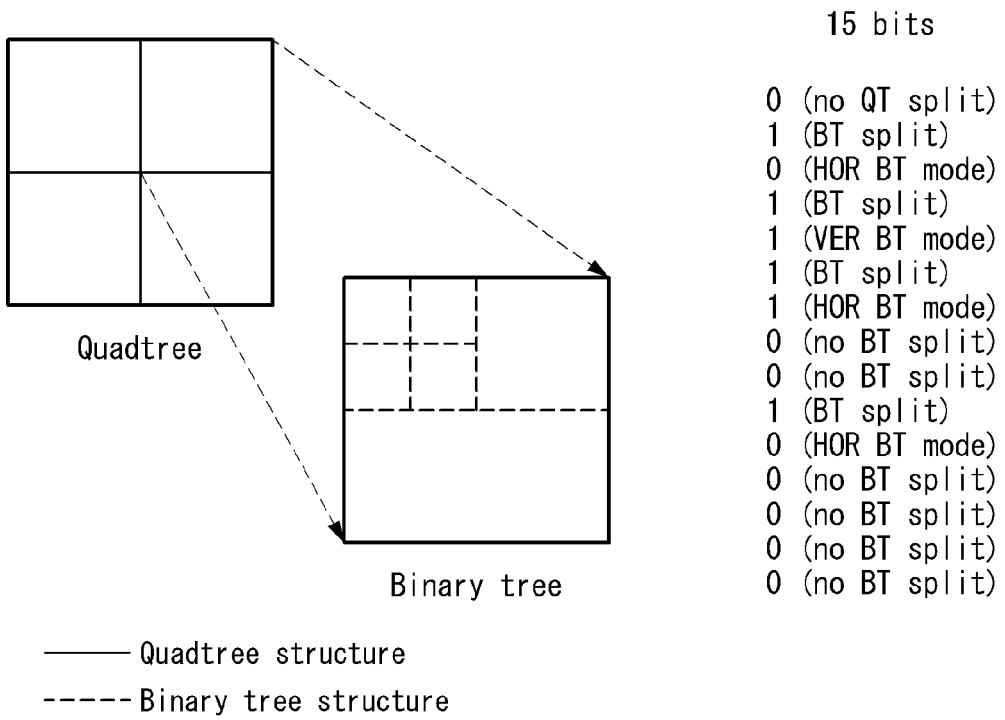

[Fig. 18]
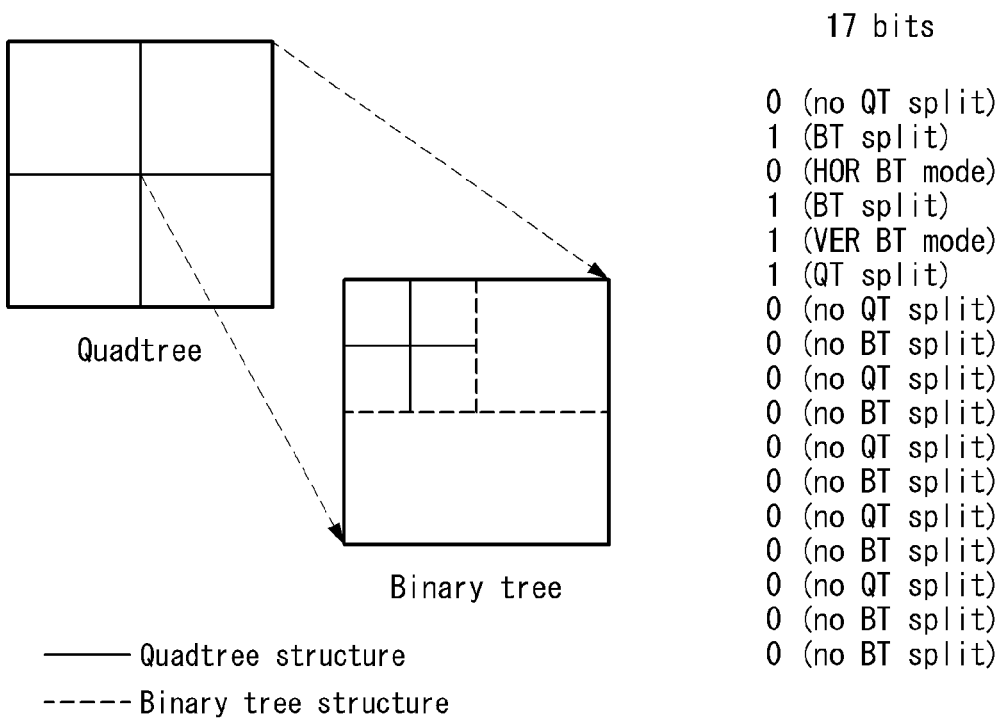

[Fig. 19]
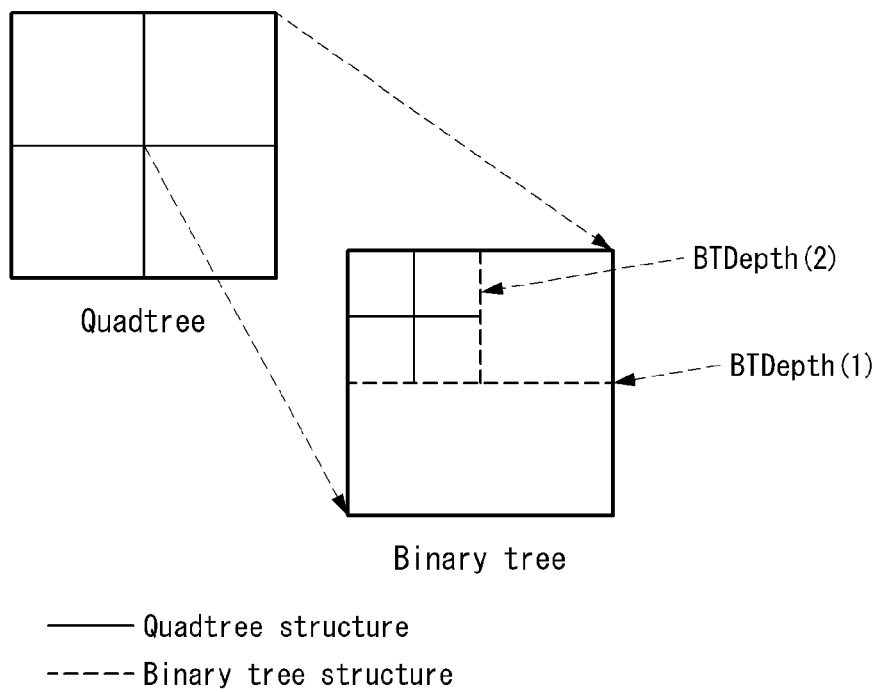

[Fig. 20]
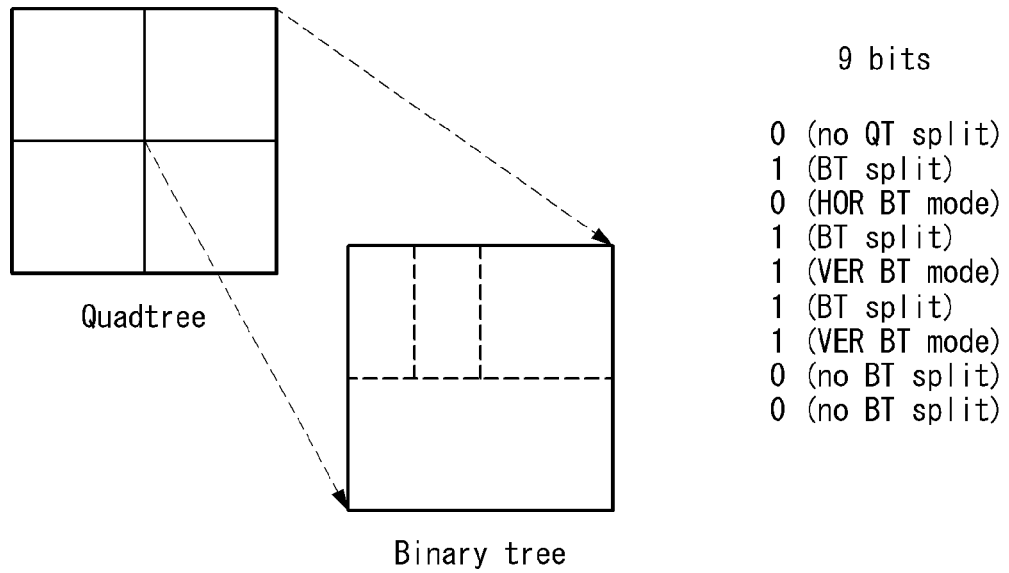
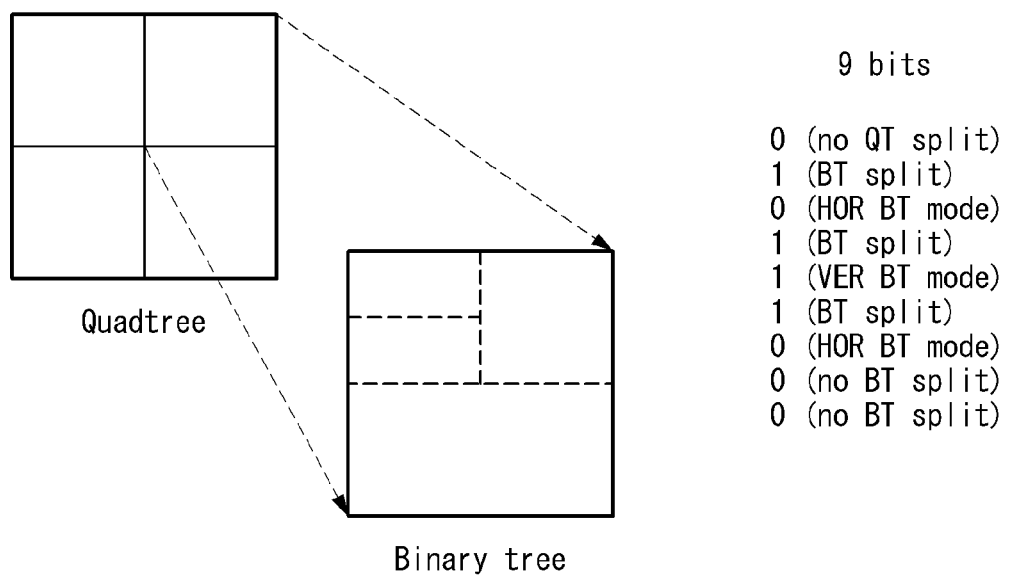
— Quadtree structure
----- Binary tree structure

[Fig. 21]
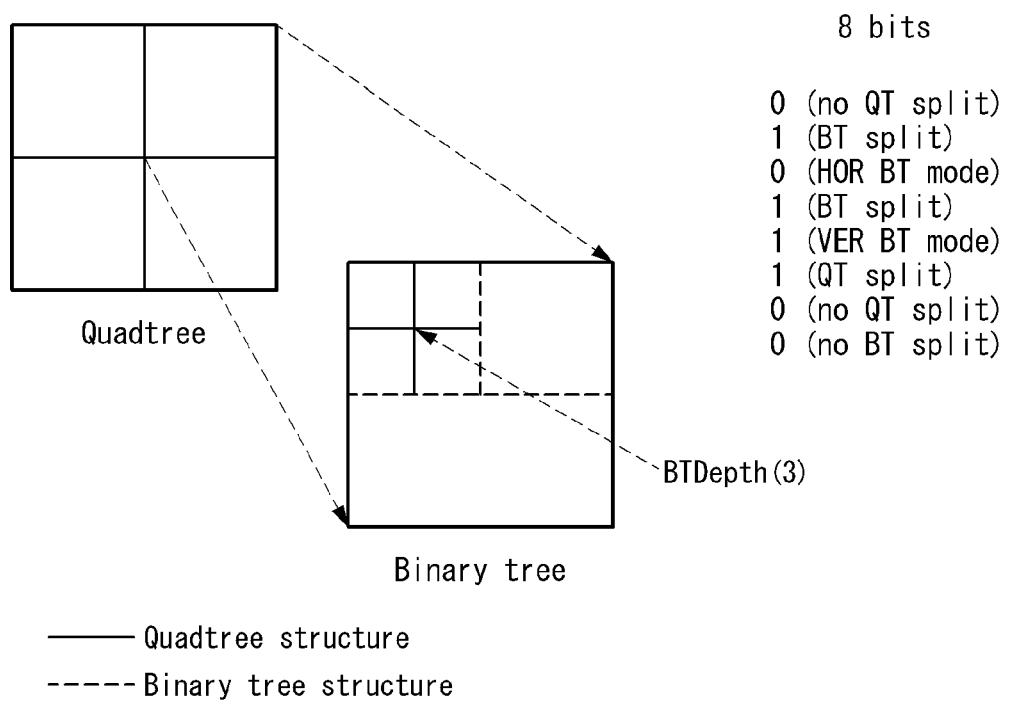

[Fig. 22]
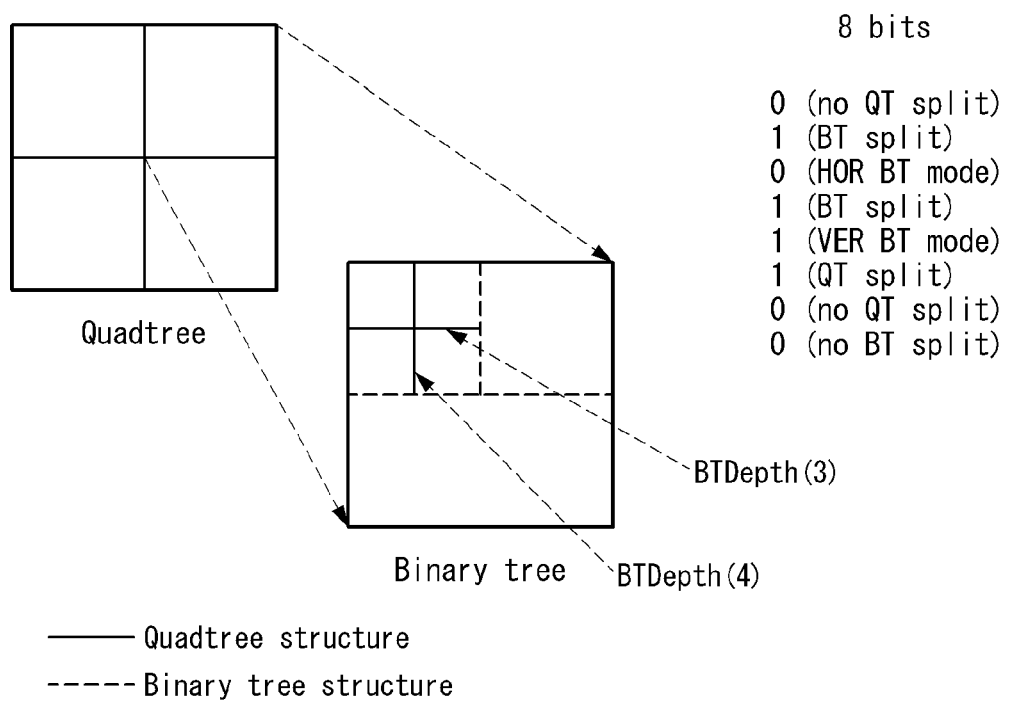

[Fig. 23]
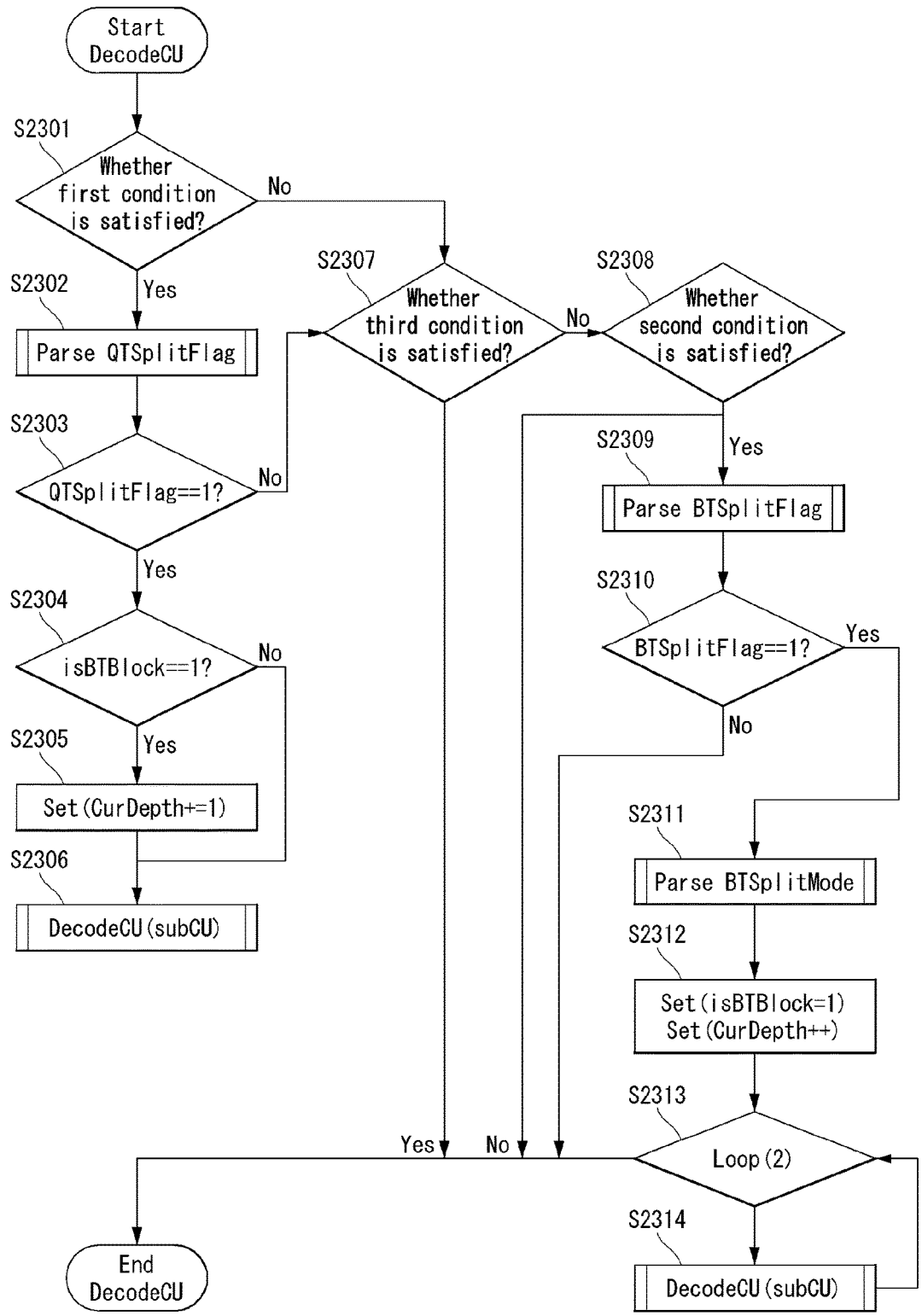

[Fig. 24]
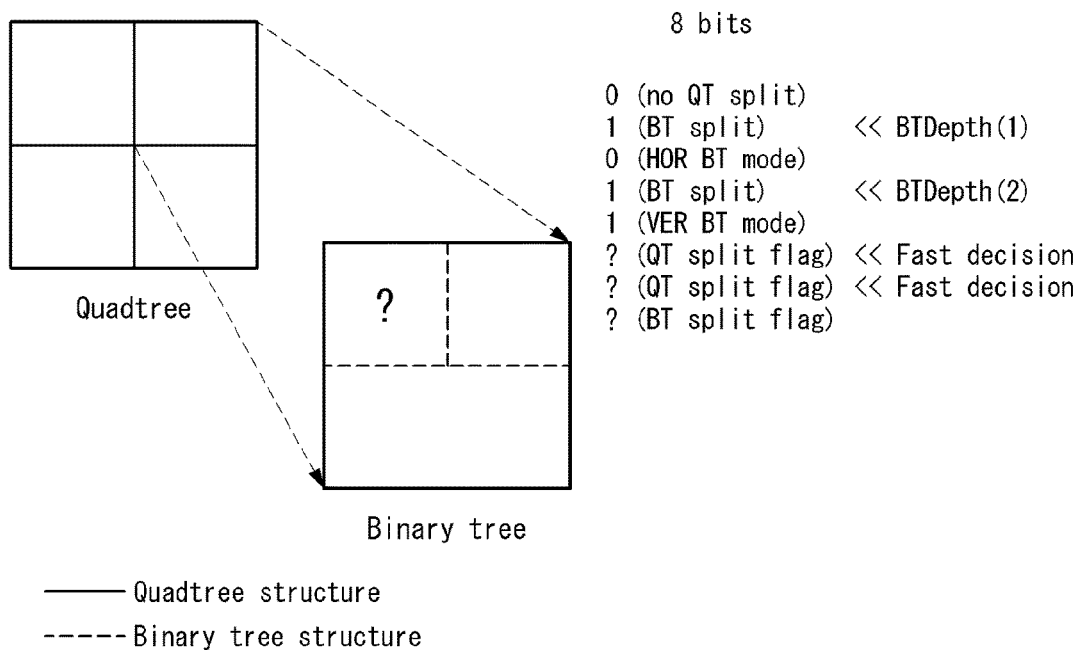

[Fig. 25]
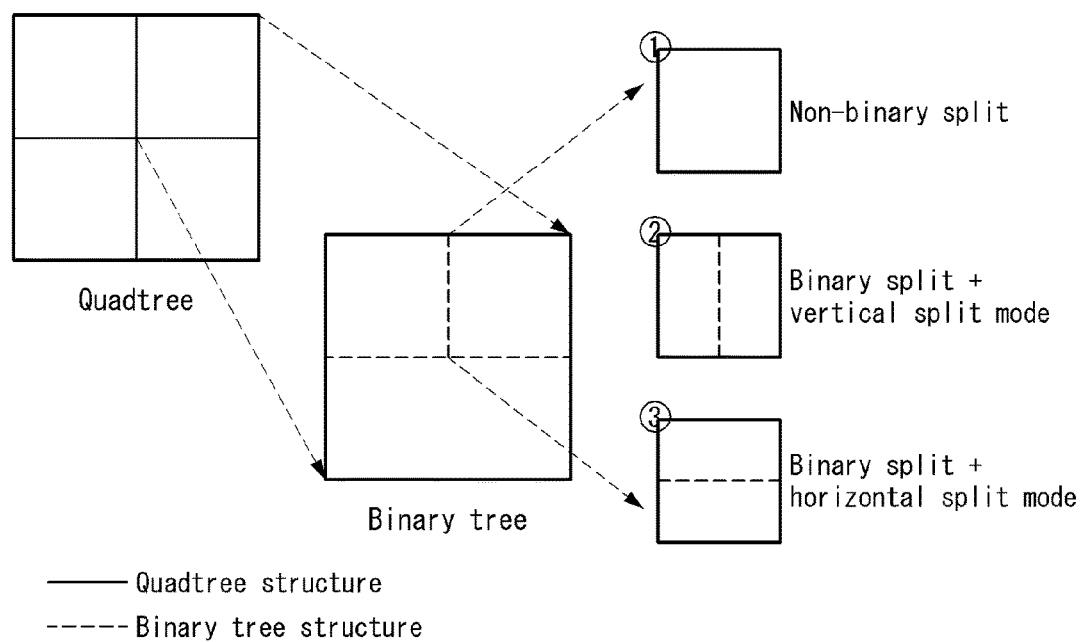

[Fig. 26]
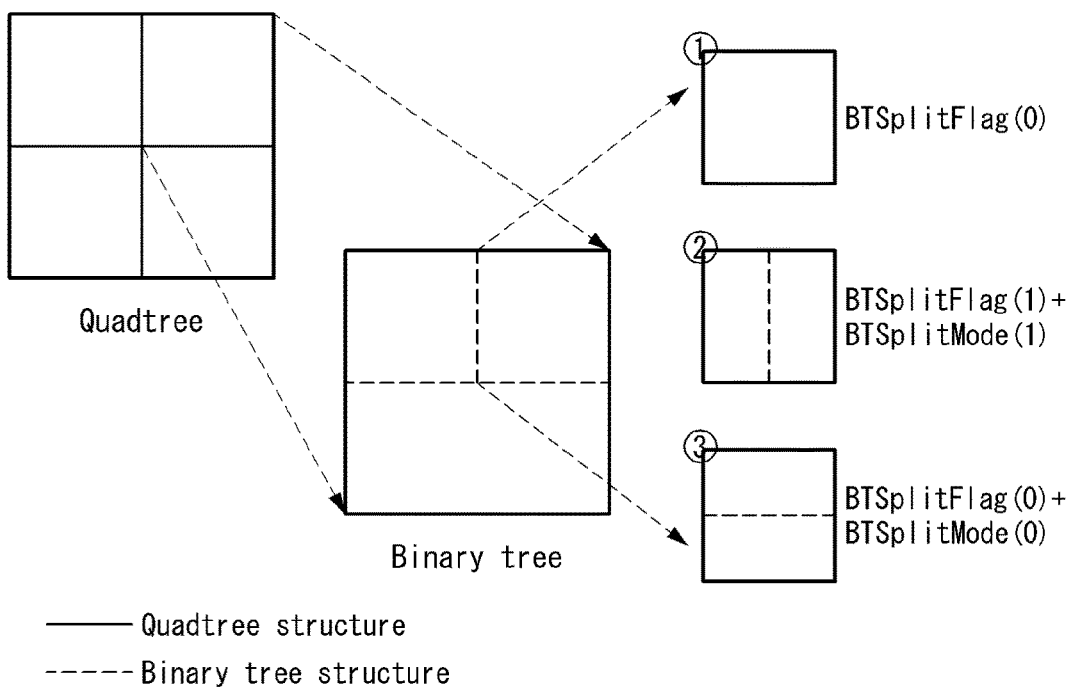

[Fig. 27]
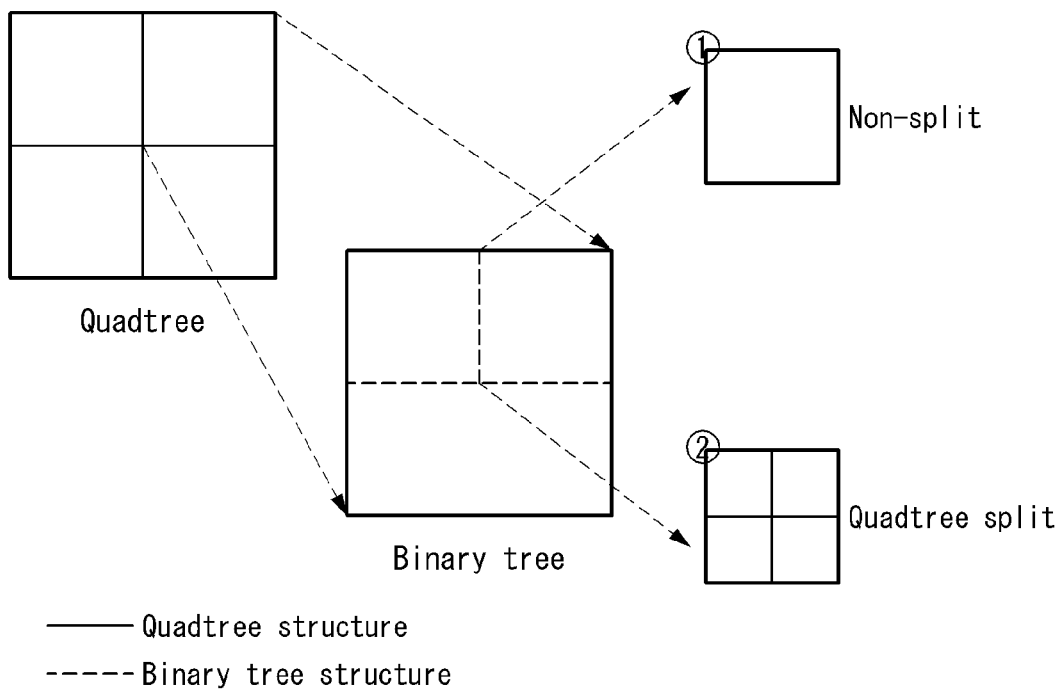

[Fig. 28]
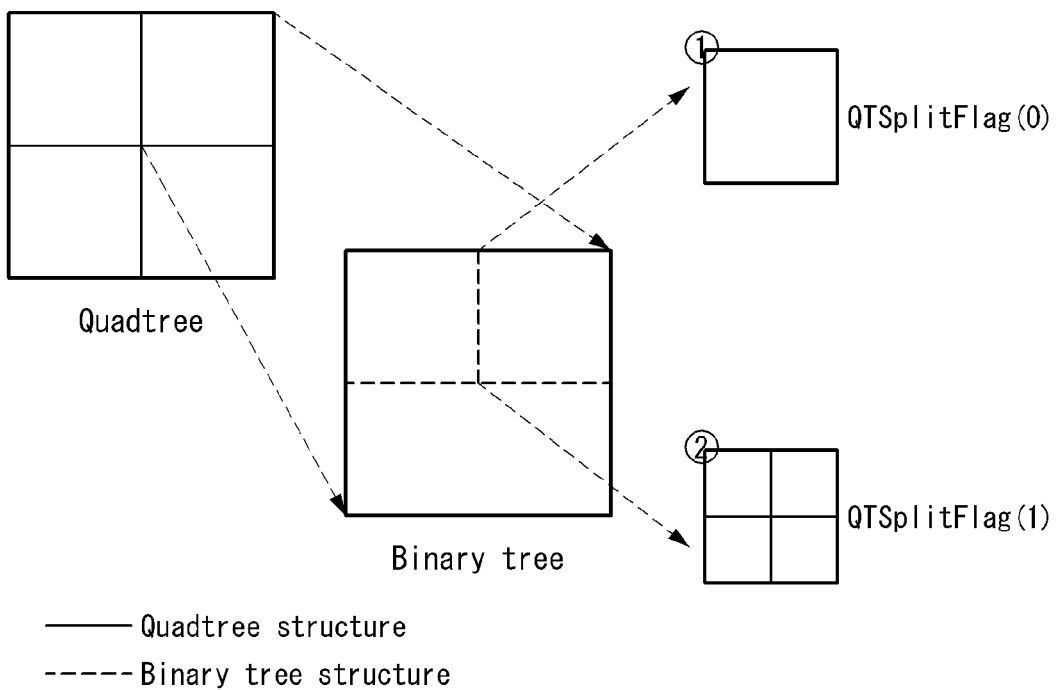

[Fig. 29]
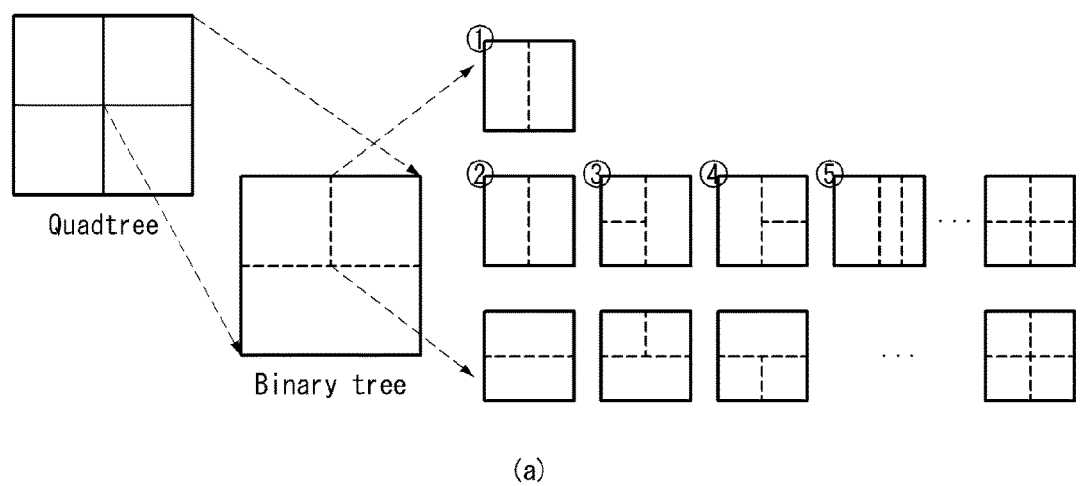
(a)
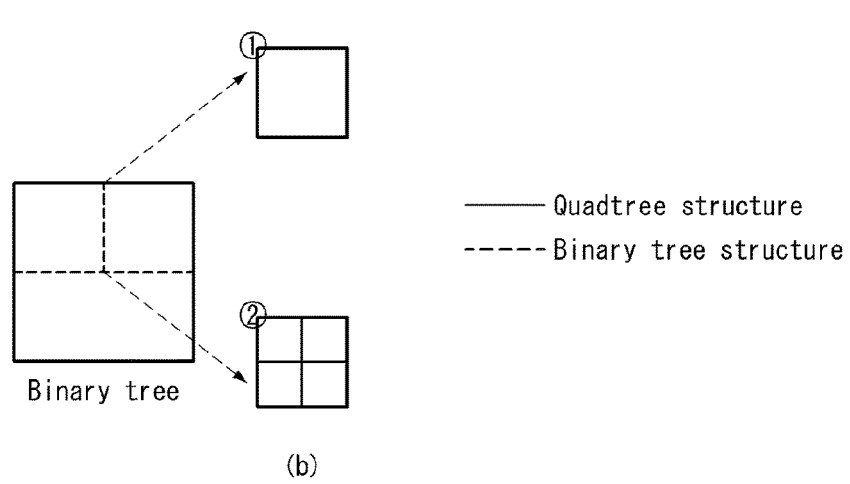
——— Quadtree structure
- - - - Binary tree structure
(b)

[Fig. 30]
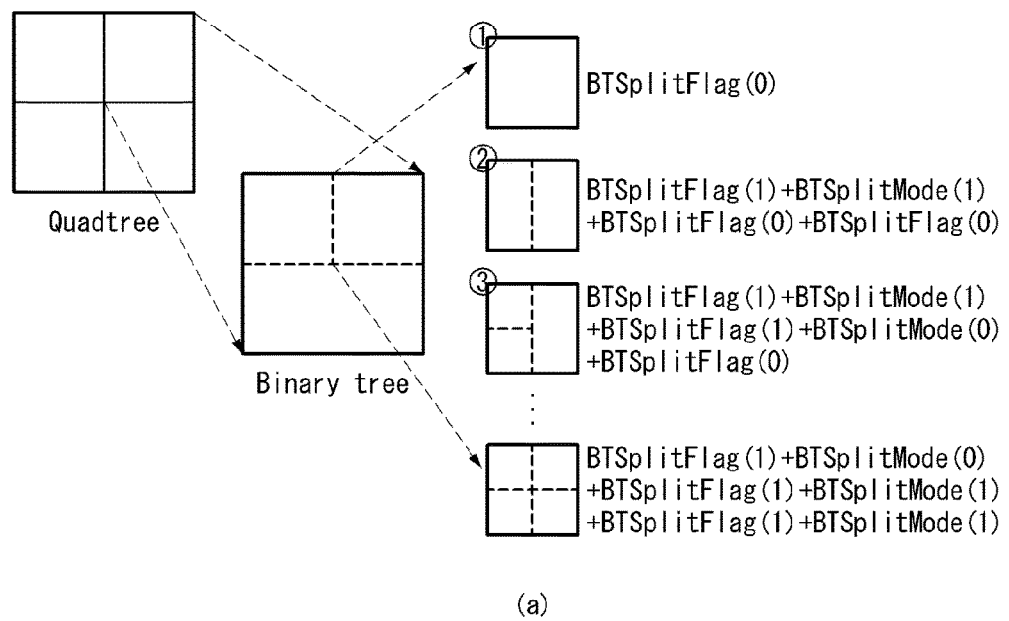
(a)
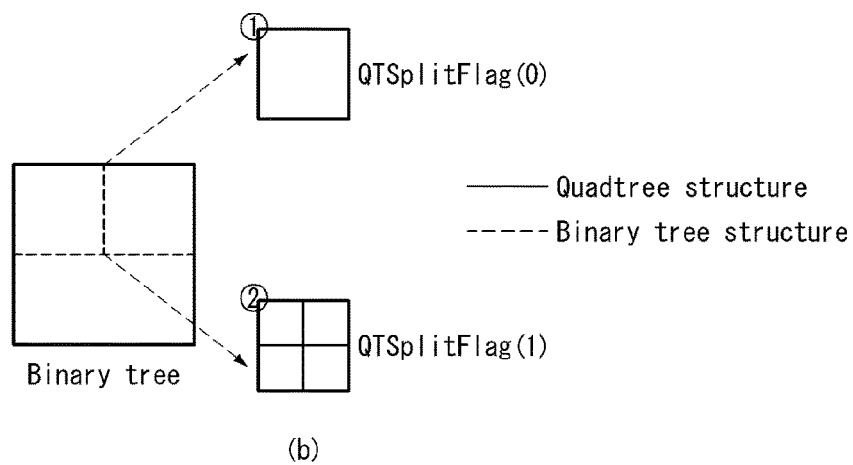
(b)

[Fig. 31]
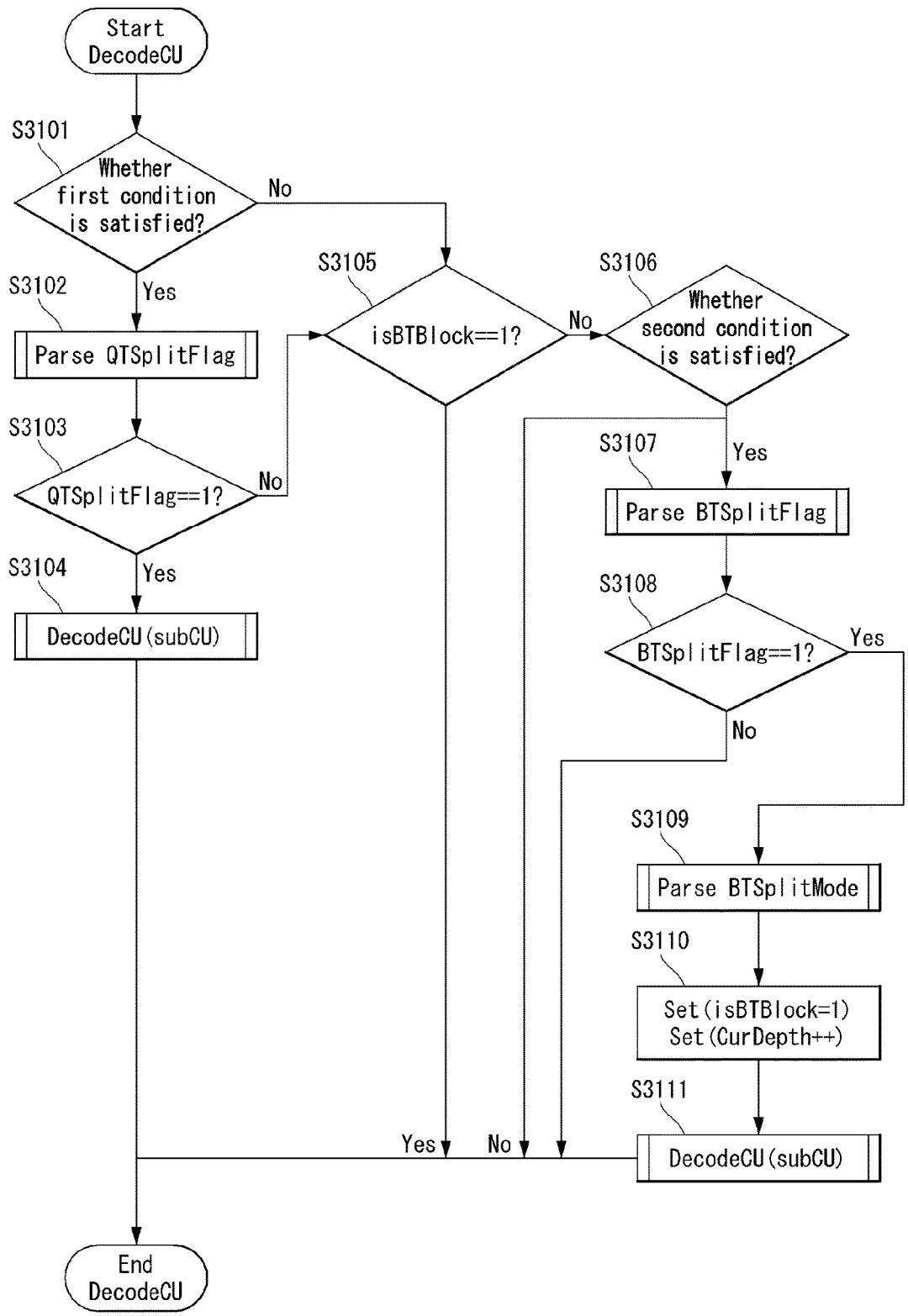

[Fig. 32]
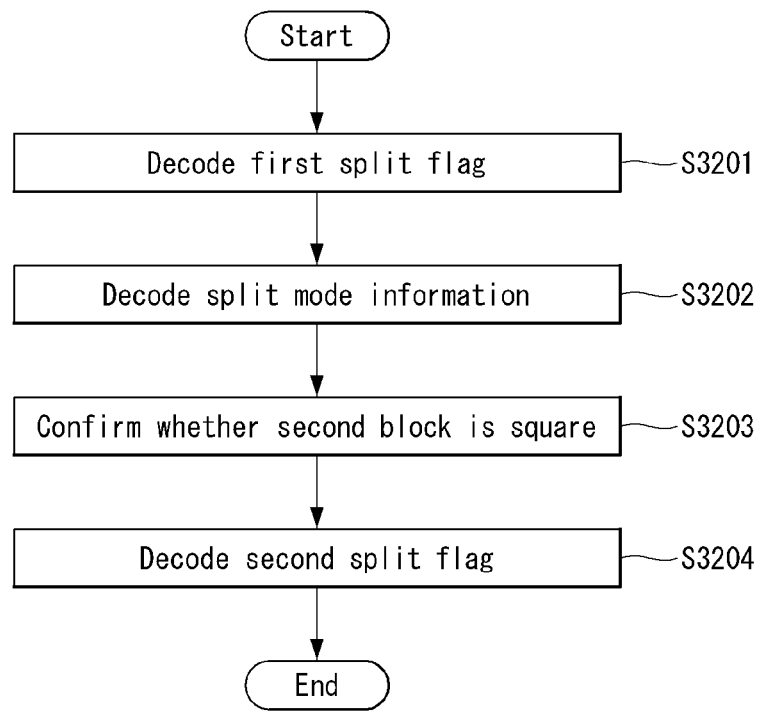

[Fig. 33]
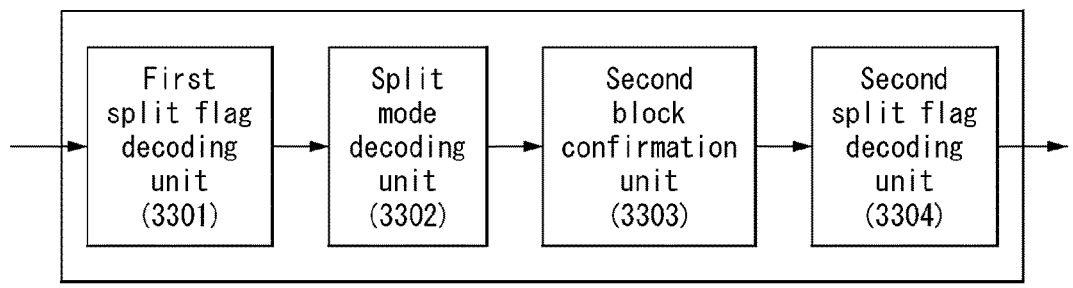

METHOD FOR PROCESSING IMAGE AND APPARATUS THEREFOR

CROSS-REFERENCE TO RELATED APPLICATIONS

This application is the National Stage filing under 35 U.S.C. 371 of International Application No. PCT/KR2017/008541, filed on Aug. 8, 2017, which claims the benefit of U.S. Provisional Application No. 62/372,267, filed on Aug. 8, 2016 the contents of which are all hereby incorporated by reference herein in their entirety.

TECHNICAL FIELD

The present invention relates to a still image or moving image processing method and, more particularly, to a method of determining the split structure of a block on which encoding/decoding is performed and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In a conventional QTBT structure, a block split in a binary tree shape has problems in that many bits may be necessary to signal split information because the block cannot be split in a quadtree shape and thus compression performance is degraded.

Accordingly, in order to solve this problem, an object of the present invention is to propose a method of splitting a square block, split using a binary tree structure, using a quadtree structure.

Furthermore, an object of the present invention is to propose a method of splitting a square block, split using a binary tree structure, using a quadtree structure in a restricted condition.

Technical objects to be achieved in the present invention are not limited to the above-described technical objects, and other technical objects not described above may be evidently understood by a person having ordinary skill in the art to which the present invention pertains from the following description.

Technical Solution

In an aspect of the present invention, a method of decoding video may include decoding a first split flag indicating whether to split a first block using a binary tree structure, decoding split mode information indicating the direction of the split when the first split flag indicates the split of the first block, determining whether a second block split from the first block is a square block based on the split mode information, and decoding a second split flag indicating whether to split the second block using a quadtree structure when, as a result of the determination, the second block is a square block.

Preferably, the step of decoding the first split flag may include the step of decoding a third split flag indicating whether to split the first block using a quadtree structure. when the third split flag indicates that the first block is not to be split, the first split flag indicating whether to split the first block using the binary tree structure may be decoded.

Preferably, the method may further include the step of decoding a fourth split flag indicating whether to split the second block using a binary tree structure if the second split flag indicates that the second block is not to be split.

Preferably, the method may further include the step of determining the second block as a decoding block indicating a unit for performing a decoding procedure if the second split flag indicates that the second block is not to be split.

Preferably, the step of decoding the second split flag may include the step of checking whether a current depth of a binary tree split of the second block is greater than or equal to a specific depth. If, as a result of the check, the current depth of the binary tree split is greater than or equal to the specific depth, the second split flag may be decoded.

Preferably, the method may further include the step of decoding a fourth split flag indicating whether to split the second block using a binary tree structure if, as a result of the check, the current depth of the binary tree split is smaller than the specific depth.

Preferably, the specific depth may be determined based on a maximum depth of the binary tree split.

Preferably, the specific depth may be a value obtained by subtracting 1 or 2 from a maximum depth of the binary tree split.

Preferably, the maximum depth of the binary tree split may be a preset value or signaled in a sequence, picture, slice or block unit from an encoder.

In another aspect of the present invention, an apparatus for decoding video may include a first split flag decoding unit configured to decode a first split flag indicating whether to split a first block using a binary tree structure, a split mode decoding unit configured to decode a split mode indicating the direction of the split when the first split flag indicates the split of the first block, a second block determination unit configured to confirm whether a second block split from the first block is a square block based on the split mode, and a second split flag decoding unit configured to decode a second split flag indicating whether to split the second block using a quadtree structure when, as a result of the confirmation, the second block is a square block.

Advantageous Effects

In accordance with an embodiment of the present invention, compression performance of video can be enhanced by improving a block structure determination method of a conventional QTBT structure and a syntax related to split information.

Furthermore, in accordance with an embodiment of the present invention, split information can be represented using less bits compared to a conventional QTBT structure by splitting a square block split in a binary tree structure using a quadtree structure, and thus coding efficiency can be improved.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram for illustrating a QTBT block split structure.

FIGS. 6 to 8 are embodiments to which the present invention may be applied and are diagrams for illustrating a comparison between a block split structure of HEVC and a block split structure of a QTBT.

FIG. 9 is an embodiment to which the present invention may be applied and is a diagram illustrating a block split structure of a QTBT.

FIG. 10 is an embodiment to which the present invention may be applied and is a diagram for illustrating a binary tree split structure of a QTBT.

FIG. 11 is an embodiment to which the present invention may be applied and is a flowchart showing a split structure determination method of a QTBT.

FIGS. 12 and 13 are embodiments to which the present invention may be applied and are diagrams for illustrating a problem that may occur in a conventional QTBT structure.

FIG. 14 is an embodiment to which the present invention may be applied and is a diagram for illustrating a problem that may occur in a conventional QTBT structure.

FIG. 15 is an embodiment to which the present invention is applied and is a flowchart showing a method of determining the split structure of a block.

FIG. 16 is an embodiment to which the present invention is applied and is a diagram illustrating a syntax signaled when a square block split in a binary tree structure is split in a quadtree structure.

FIGS. 17 and 18 are embodiments to which the present invention may be applied and are diagrams for illustrating a comparison of split information occurring when a square block split in a binary tree structure is split in a quadtree structure.

FIGS. 19 to 22 are embodiments to which the present invention is applied and are diagrams illustrating a block split structure according to a split depth.

FIG. 23 is an embodiment to which the present invention is applied and is a flowchart showing a method of determining the split structure of a block.

FIGS. 24 to 28 are embodiments to which the present invention is applied and are diagrams illustrating a fast decision method of a split mode.

FIGS. 29 and 30 are embodiments to which the present invention is applied and are diagrams illustrating a fast decision method of a split mode.

FIG. 31 is an embodiment to which the present invention is applied and is a flowchart showing a method of determining the split structure of a block.

FIG. 32 is a diagram illustrating a video processing method according to an embodiment of the present invention.

FIG. 33 is a diagram illustrating a block split structure determination apparatus according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit by which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are collectively called a sample. Furthermore, to use a sample may mean to use a pixel value, a picture element value or the like.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Quadtree Plus Binary Tree (QTBT)

A QTBT refers to the structure of a decoding block in which a quadtree structure and a binary tree structure have been combined. Specifically, in a conventional QTBT block split structure, an image is coded in a CTU unit, a CTU is split in a quadtree shape, and a leaf node of a quadtree is additionally split in a binary tree shape. A QTBT structure and a split flag syntax supporting the same are described with reference to the following drawings.

FIG. 5 is an embodiment to which the present invention may be applied and is a diagram for illustrating a QTBT block split structure.

Referring to FIG. 5, a current block (i.e., CTU) may be split in a QTBT structure. That is, the CTU may be first split in a quadtree shape hierarchically. Furthermore, a leaf node of a quadtree no longer split in a quadtree shape may be split in a binary tree shape hierarchically.

In order to determine the split of a quadtree in the QTBT structure, the encoder signals a split flag to the decoder. In this case, the quadtree split may be adjusted (or limited) by a MinQTLumaISLice, MinQTChromaISlice or MinQTNonISlice value. In this case, MinQTLumaISLice indicates a minimum size of a quadtree leaf node of a luma component in an I-slice, MinQTLumaChromaISlice indicates a minimum size of a quadtree leaf node of a chroma component in the I-slice, and MinQTNonISlice indicates a minimum size of a quadtree leaf node in a non I-slice.

Unlike in the quadtree structure of HEVC, in the quadtree structure of a QTBT, a luma component and a chroma component may have independent split structure in the I-slice. This is described with reference to the following drawings.

FIGS. 6 to 8 are embodiments to which the present invention may be applied and are diagrams for illustrating a comparison between a block split structure of HEVC and a block split structure of a QTBT.

Referring to FIG. 6, in the quadtree structure of HEVC, the split structures of a luma component (FIG. 6(a)) and a chroma component (FIG. 6(b)) are identically determined.

In contrast, referring to FIG. 7, in the QTBT structure, in the case of an I-slice, the block split structures of a luma component (FIG. 7(a)) and a chroma component (FIG. 7(b)) may be differently determined. In order to support such a split structure, MinQTLumaISlice and MinQTChromaISlice may have different values.

Referring to FIG. 8, in a non I-slice of a QTBT, the quadtree structures of a luma component (FIG. 8(a)) and a chroma component (FIG. 8(b)) are identically determined. To this end, the quadtree split structures of the luma component (FIG. 8(a)) and the chroma component (FIG. 8(b)) in the non I-slice may be adjusted by an MinQTNonISlice value.

In a QTBT structure, a leaf node of a quadtree may be split in a binary tree shape. In this case, the binary tree split may be adjusted (or limited) by MaxBTDepth, MaxBTDepthISliceL and MaxBTDepthISliceC. In this case, MaxBTDepth indicates a maximum depth of the binary tree split based on the leaf node of the quadtree in a non I-slice, MaxBTDepthISliceL indicates a maximum depth of the binary tree split of a luma component in an I-slice, and MaxBTDepthISliceC indicates a maximum depth of the binary tree split of a chroma component in the !-slice.

As described above, since a luma component and a chroma component may have different structures in the I-slice of a QTBT, MaxBTDepthISliceL and MaxBTDepthISliceC may have different values in the I-slice.

FIG. 9 is an embodiment to which the present invention may be applied and is a diagram illustrating a block split structure of a QTBT.

Referring to FIG. 9, a case where a current slice is an I-slice is assumed. A leaf node of a quadtree split in a quadtree structure may be split in a binary tree shape. As described above, a luma component (FIG. 8(a)) and a chroma component (FIG. 8(b)) may have different split structures in the I-slice.

FIG. 10 is an embodiment to which the present invention may be applied and is a diagram for illustrating a binary tree split structure of a QTBT.

Referring to FIG. 10, the binary tree of the QTBT may be split in a horizontal direction or a vertical direction. If the binary tree is split into a node of a lower depth, a split mode indicating that the binary tree will be split in which direction in addition to BinarySplitFlag indicating whether or not to perform a binary split needs to be signaled.

For example, when BinarySplitFlag is 1 (i.e., when a binary split is performed), BTSplitMode may be signaled. In this case, BTSplitMode indicates a split mode. When BTSplitMode is 0, the binary tree may be split in a horizontal direction as shown in FIG. 10(a). When BTSplitMode is 1, the binary tree may be split in a vertical direction as shown in FIG. 10(b).

FIG. 11 is an embodiment to which the present invention may be applied and is a flowchart showing a split structure determination method of a QTBT.

A split structure determination method of a QTBT according to the present embodiment may be applied to the encoder and the decoder. The decoder is described as a basis, for convenience of description.

The decoder determines whether a current block satisfies a first condition (S1101). In this case, the current block may be a coding unit, a decoding block, a prediction unit, a prediction block, a transform block, a transform unit or the like. The first condition may be, for example, 1) whether the current block is greater than or equal to a minimum size of a quadtree block, 2) whether the width and height of the current block are the same (i.e., whether the current block is a square block, 3) whether the current block is not isBTBlock. In this case, isBTBlock indicates a block on which a binary tree split has been performed more than once.

If, as a result of the determination at step S1101, the first condition is satisfied, the decoder parses QTSplitFlag (S1102). In this case, QTSplitFlag is a flag indicating whether the current block will be split in a quadtree shape.

The decoder determines whether a QTSplitFlag value parsed at step S1102 is 1 (S1103). When the QTSplitFlag value is 1, the decoder fetches a decoding process (or decoding function) for determining a split structure while rounding a loop with respect to each block (or sub-block) having four lower depths split from the current block (S1104, S1105). When the fetching of the decoding function is terminated with respect to the block having the four lower depths, the decoder terminates the split structure determination process of the current block.

If, as a result of the determination at step S1101, the first condition is not satisfied or a QTSplitFlag value parsed at step S1103 is 0 (i.e., if the current block has not been split in a quadtree shape), the decoder determines whether a second condition is satisfied (S1106). The second condition may be, for example, whether the current depth of a binary tree split is smaller than a maximum depth of the binary tree split.

If, as a result of the determination at step S1106, the second condition is satisfied, the decoder parses BTSplitFlag (S1107). In this case, BTSplitFlag is a flag indicating whether the current block will be split in a binary tree shape.

The decoder determines whether the BTSplitFlag value parsed at step S1107 is 1 (S1108). When the BTSplitFlag value is 1, the decoder parses BTSplitMode (S1109). In this case, BTSplitMode indicates a split mode of a binary tree split. As described above, when the BTSplitMode value is 1, it indicates a vertical split mode. When the BTSplitMode value is 0, it indicates a horizontal split mode. Furthermore, the decoder sets the isBTBlock value to 1 and increases the current depth of the binary tree split by 1 (S1110).

The decoder fetches a decoding function for determining a split structure while rounding a loop with respect to each block (or sub-block) having two lower depths split from the current block (S1111, S1112). When the fetching of the decoding function is terminated with respect to the block having the two lower depths, the decoder terminates the split structure determination process of the current block. When the BTSplitFlag value is 0 or if, as a result of the determination at step S1106, the second condition is not satisfied, the decoder terminates the split structure determination process of the current block.

As described above, a QTBT may have higher compression performance compared to the existing quadtree structure of HEVC because it has the diversity of a block structure by grafting a binary tree structure upon a quadtree structure. However, the QTBT structure may have an inefficient split structure. That is, a binary tree of the QTBT structure may be slit from a leaf node of a quadtree. When the quadtree is split in a binary tree, the binary tree cannot be split in a quad tree shape again. This is described with reference to the following drawings.

FIGS. 12 and 13 are embodiments to which the present invention may be applied and are diagrams for illustrating a problem that may occur in a conventional QTBT structure.

As shown in FIG. 12(a), a case where a CTU is split is described as an example. As shown in FIG. 12(b), a syntax (or block split information) may be signaled from the encoder to the decoder.

Referring to FIG. 12(b), a CTU is a root node of a quadtree and has a depth of 0. A first node 1201 among nodes split from the CTU and having a depth of 1 is split in a quadtree shape. In this case, a quadtree split flag indicating whether or not to perform the quadtree split has a value 1. A second node 1202 among the nodes split from the CTU and having a depth of 1 corresponds to a leaf node of a quadtree not split in a quadtree shape. In this case, a quadtree split flag has a value 0.

Thereafter, as shown in FIG. 12(a), the second node 1202 among the nodes having a depth of 1 may be split in a binary tree shape twice in order to have a split structure. That is, after the second node is split from the leaf node of the quadtree in a vertical direction, each of the split two non-squares is split in a horizontal direction. When the non-square is split in the vertical direction, a binary split flag indicating a binary split has a 1 value, and a binary split mode flag indicating a split mode has a 1 value. When the non-square is split in the horizontal direction, a binary split flag indicating a binary split has a 1 value and a binary split mode flag indicating a split mode has a 0 value.

Referring to FIG. 13(a), a CTU may be split in a block structure through a quadtree split as shown in FIG. 12(a). Referring to FIG. 13(b), each of a first node 1301 and a second node 1302 among nodes split from the CTU and having a depth of 1 is split in a quadtree shape. In this case, a quadtree split flag indicating whether or not to perform the quadtree split has a 1 value. A quadtree split flag has a 0 value in subsequent leaf nodes.

Referring to FIGS. 12(b) and 13(b), if a split is performed in the same structure as a quadtree through a binary tree split, there is a problem in that a case where a split is performed in a binary tree requires signaling of more bits than a case where a split is performed in a quadtree. FIGS. 12 and 13 are examples for illustrating such a problem. In the same condition as that described above, a quadtree split not a binary tree split may be determined in a rate-distortion optimization (RDO) process. Another example of a problem that may occur is described with reference to the following drawing.

FIG. 14 is an embodiment to which the present invention may be applied and is a diagram for illustrating a problem that may occur in a conventional QTBT structure.

Referring to FIG. 14(b), a first node 1301 among nodes having a depth of 3 based on a root node of a quadtree (i.e., depth=0) corresponds to a square block. The first node 1401 may be split into four square blocks through a binary tree split, as described in FIG. 12. That is, in a conventional QTBT structure, after the first node is split in a binary tree shape from the leaf node of the quadtree, it cannot be split in a quadtree structure even in the case of a square block, but may be split into four square blocks only in a binary tree structure.

That is, according to a conventional QTBT structure, after the first node is split in a binary tree shape, it cannot be split again in a quadtree shape. Accordingly, there are problems in that many bits may be necessary to signal split information and thus compression performance is degraded.

Accordingly, in order to solve such a problem, the present invention proposes a method of splitting a block, split in a binary tree structure, in a quadtree structure in a QTBT structure.

Embodiment 1

The present embodiment proposes a method of splitting a block, split in a binary tree structure, in a quadtree structure in a QTBT structure.

The encoder/decoder may split a square block after it is split in a binary tree structure in a quadtree structure. The encoder/decoder may split a square block greater than MinQTLumaISlice or MinQTChromaISlice in the case of an I-slice and a square block greater than MinQTNonISlice in the case of a non I-slice in a quadtree structure.

FIG. 15 is an embodiment to which the present invention is applied and is a flowchart showing a method of determining the split structure of a block.

The split structure determination method according to the present embodiment may be applied to the encoder and the decoder. The decoder is described as a basis, for convenience of description.

The decoder determines whether a current block satisfies a first condition (S1501). In this case, the current block may be a coding unit, a decoding block, a prediction unit, a prediction block, a transform block, a transform unit or the like. The first condition may be, for example, 1) whether the current block is greater than or equal to a minimum size of a quadtree block, 2) whether the width and height of the current block are the same (i.e., whether the current block is a square block).

If, as a result of the determination at step S1501, the first condition is satisfied, the decoder parses QTSplitFlag (S1502). In this case, QTSplitFlag is a flag indicating whether the current block will be split in a quadtree shape.

The decoder determines whether a QTSplitFlag value parsed at step S1502 is 1 (S1503).

If, as a result of the determination at step S1503, the QTSplitFlag value is 1, the decoder determines whether an isBTBlock value is 1 (S1504). When the isBTBlock value is 1, it indicates that the current block is a block on which a binary tree split has been performed more than once.

If, as a result of the determination at step S1504, the isBTBlock value is 1 (i.e., if the current block is a block that has been split in a binary tree structure more than once), the decoder increases the current depth of a binary tree split by 1 (S1505). Furthermore, the decoder fetches a decoding process (or decoding function) for determining a split structure while rounding a loop with respect to each block (or sub-block) having four lower depths split from the current block (S1506, S1507). When the fetching of the decoding function is terminated with respect to the block having the four lower depths, the decoder terminates the split structure determination process of the current block.

If, as a result of the determination at step S1504, the isBTBlock value is 0 (i.e., if the current block is a block not split in a binary tree structure), the decoder fetches a decoding process (or decoding function) for determining a split structure while rounding a loop with respect to each block (or sub-block) having four lower depths split from the current block (S1506, S1507).

If, as a result of the determination at step S1501, the first condition is not satisfied or when a QTSplitFlag value parsed at step S1503 is 0, the decoder determines whether a second condition is satisfied (S1508). The second condition may be, for example, whether the current depth of a binary tree split is smaller than a maximum depth of the binary tree split.

If, as a result of the determination at step S1508, the second condition is satisfied, the decoder parses BTSplitFlag (S1509). In this case, BTSplitFlag is a flag indicating whether the current block will be split in a binary tree shape.

The decoder determines whether the BTSplitFlag value parsed at step S1509 is 1 (S1510). When the BTSplitFlag value is 1, the decoder parses BTSplitMode (S1511). The decoder sets an isBTBlock value to 1 and increases the current depth of the binary tree split by 1 (S1512).

The decoder fetches a decoding function for determining a split structure while rounding a loop with respect to each block (or sub-block) having two lower depths split from the current block (S1513, S1514). When the fetching of the decoding function is terminated with respect to the block having the two lower depths, the decoder terminates the split structure determination process of the current block. When the BTSplitFlag value is 0 or if, as a result of the determination at step S1508, the second condition is not satisfied, the decoder terminates the split structure determination process of the current block.

Split information can be represented using smaller bits compared to a conventional QTBT structure because a square block split in a binary tree structure is split in a quadtree structure, and thus coding efficiency can be improved.

FIG. 16 is an embodiment to which the present invention is applied and is a diagram illustrating a syntax signaled when a square block split in a binary tree structure is split in a quadtree structure.

Referring to FIG. 16, the encoder/decoder may split a CTU in the same structure as the split structure, described in the example of FIG. 14, according to the method proposed in the present embodiment.

Specifically, in the case of a first node 1601, 1602 among nodes having a depth of 3 based on a root node of a quadtree (i.e., depth=0), the first node corresponds to a square block split in a binary tree structure. The encoder/decoder may split the square block, split in the binary tree structure, in a quadtree structure.

FIG. 16(a) shows split information signaled when a split is performed without limitation to MinQTSize indicating a minimum size of a quadtree block and MaxBTDepth indicating a maximum depth of a binary tree split. That is, there is a need for the signaling of a split flag indicating whether or not to perform a split at a leaf node split in a quadtree structure from the first node 1601 among nodes having a depth of 3.

Referring to FIG. 16(b), a case where a CTU is 128×128 and MinQTsize is 16×16 or a case where MaxBTDepth is 3 are assumed. If there is limitation to MinQTsize or MaxBTDepth as described above, a leaf node split in a quadtree structure from the first node 1601 among nodes having a depth of 3 can be no longer split. Accordingly, the signaling of a split flag indicating whether or not to perform a split may not be required.

Embodiment 2

The present embodiment proposes a method of splitting a block, split in a binary tree structure, in a quadtree structure in a restricted condition, in a QTBT structure.

If a square block split in a binary tree structure is split in a quadtree structure, split information indicating whether the square block after the binary tree split will be split in a quadtree split or a binary tree split needs to be signaled as described in FIG. 16. Such a method may use many bits compared to a restricted case. This is described with reference to the following drawings.

FIGS. 17 and 18 are embodiments to which the present invention may be applied and are diagrams for illustrating a comparison of split information occurring when a square block split in a binary tree structure is split in a quadtree structure.

In FIG. 17, a case where a square block split in a binary tree structure is split in a conventional QTBT structure is assumed. Furthermore, in FIG. 18, a case where a square block split in a binary tree structure is split in the same split structure as the split structure shown in FIG. 17 using the method proposed in Embodiment 1 is assumed.

If a square block split in a binary tree structure is split in a conventional QTBT structure, split information of a total of 15 bits is necessary to represent the split structure shown in FIG. 17. However, referring to FIG. 18, in order to represent the same split structure by applying the method described in Embodiment 1, split information of a total of 17 bits may be necessary. If a square block split in a binary tree structure is split in a quadtree structure, more bits may be necessary compared to a conventional QTBT structure because split flag information indicating a quadtree split or a binary tree split at a leaf node is signaled.

Accordingly, the present invention proposes a method of splitting a block, split in a binary tree structure, in a quadtree structure in a restricted condition. That is, signaled bits can be reduced and compression performance can be improved because a block, split in a binary tree structure, is split in a quadtree structure only in a specific condition.

In one embodiment of the present invention, the encoder/decoder may split a square block, having a depth of a specific depth or more among blocks split in a binary tree structure, in a quadtree structure. This is described with reference to the following drawings.

FIGS. 19 to 22 are embodiments to which the present invention is applied and are diagrams illustrating a block split structure according to a split depth.

Referring to FIG. 19, a block split in a binary tree may be split into square blocks when it is split in a binary tree structure at least twice. Accordingly, a method of splitting a block, split in a binary tree structure, in a quadtree structure may be applied to a case where the depth of a binary tree split is 2 or more.

Referring to FIG. 20, a case where a square block is split in a conventional QTBT structure is assumed. When the current depth of a binary tree split is 2 and a maximum depth of the binary tree split is 3, the encoder/decoder cannot split a square block of a current depth in a quadtree structure, but may split the square block into non-square blocks having a long width or height as shown in FIG. 20. That is, when a maximum depth of a binary tree split is 4 or more, the encoder/decoder may split a square block in a binary tree structure as shown in FIG. 19.

However, if the method proposed in this specification is applied, although the current depth of a binary tree split is 2 and a maximum depth of the binary tree split is 3, the encoder/decoder may split a square block, split in a binary tree structure, in a quadtree structure as shown in FIG. 21.

If a quadtree split is performed after the binary tree split, the encoder/decoder may increase a current depth by 1 as shown in FIG. 21 or may increase the current depth by 2 as shown in FIG. 22.

Referring to FIGS. 21 and 22, if the current depth of a leaf node split into a quadtree structure from a current block is greater than or equal to a maximum depth of a binary tree split, the encoder may not signal flag information indicating whether or not to additionally split the leaf node. That is, if a square block having a depth of a specific depth or more is split in a quadtree structure, the encoder/decoder may not signal split information on a leaf node. If a square block split in a binary tree structure has a depth of a specific depth or more, the encoder/decoder can split the square block into more sub-divided areas compared to the existing binary tree split (i.e., a conventional QTBT) using smaller bits by splitting the square block in a quadtree structure.

FIG. 23 is an embodiment to which the present invention is applied and is a flowchart showing a method of determining the split structure of a block.

The split structure determination method according to the present embodiment may be applied to the encoder and the decoder. The decoder is described as a basis, for convenience of description.

The decoder determines whether a current block satisfies a first condition (S2301). In this case, the current block may be a coding unit, a decoding block, a prediction unit, a prediction block, a transform block, a transform unit or the like. The first condition may be, for example, 1) whether the current block is greater than or equal to a minimum size of a quadtree block, 2) whether the width and height of the current block are the same (i.e., whether the current block is a square block).

If, as a result of the determination at step S2301, the first condition is satisfied, the decoder parses QTSplitFlag (S2302). In this case, QTSplitFlag is a flag indicating whether the current block will be split in a quadtree shape.

The decoder determines whether a QTSplitFlag value parsed at step S2302 is 1 (S2303).

If, as a result of the determination at step S2303, the QTSplitFlag value is 1, the decoder determines whether an isBTBlock value is 1 (S2304). When the isBTBlock value is 1, this indicates that the current block is a block on which a binary tree split has been performed more than once.

If, as a result of the determination at step S2304, the isBTBlock value is 1 (i.e., if the current block is a block that has been split in a binary tree structure more than once), the decoder increases the current depth of the binary tree split by 1 (S2305). If a quadtree split is performed after a binary tree split as described above, the encoder/decoder may increase a current depth by 1 as shown in FIG. 21 or may increase the current depth by 2 as shown in FIG. 22. In FIG. 23, a case where the current depth is increased by 1 is assumed.

Furthermore, the decoder fetches a decoding process (or decoding function) for determining a split structure while rounding a loop with respect to each block (or sub-block) having four lower depths split from the current block (S2306).

If, as a result of the determination at step S2304, the isBTBlock value is 0 (i.e., if the current block is a block not split in a binary tree structure), the decoder fetches a decoding process (or decoding function) for determining a split structure while rounding a loop with respect to each block (or sub-block) having four lower depths split from the current block (S2306).

If, as a result of the determination at step S2301, the first condition is not satisfied or when a QTSplitFlag value parsed at step S2303 is 0, the decoder determines whether a third condition is satisfied (S2307). The third condition may be, for example, 1) whether the isBTBlock value is 1 (i.e., whether the current block is a block split in a binary tree structure more than once), 2) whether the current depth of a binary tree split is greater than or equal to a value obtained by subtracting 1 from a maximum depth of a binary tree split.

If, as a result of the determination at step S2308, the third condition is not satisfied, the decoder determines whether a second condition is satisfied (S2308). The second condition may be, for example, whether the current depth of a binary tree split is smaller than a maximum depth of the binary tree split.

If, as a result of the determination at step S2308, the second condition is satisfied, the decoder parses BTSplitFlag (S2309). In this case, BTSplitFlag is a flag indicating whether the current block will be split in a binary tree shape.

The decoder determines whether the BTSplitFlag value parsed at step S2309 is 1 (S2310). When the BTSplitFlag value is 1, the decoder parses BTSplitMode (S2311). The decoder sets an isBTBlock value to 1 and increases the current depth of the binary tree split by 1 (S2312).

The decoder fetches a decoding function for determining a split structure while rounding a loop with respect to each block (or sub-block) having two lower depths split from the current block (S2313, S2314). When the fetching of the decoding function is terminated with respect to the block having the two lower depths, the decoder terminates the split structure determination process of the current block. When the BTSplitFlag value is 0, if, as a result of the determination at step S2307, the third condition is satisfied or if, as a result of the determination at step S2308, the second condition is not satisfied, the decoder terminates the split structure determination process of the current block.

That is, the decoder may confirm only whether a current block will be split in a quadtree structure when the current block is a square block and the current depth of a binary tree split is smaller than or equal to a value obtained by subtracting 2 from a maximum depth of the binary tree split. When the current depth of a current block is smaller than or equal to a value obtained by subtracting 2 from a maximum depth, the encoder may signal quadtree split flag information. When QTSplitFlag indicating whether a current block will be split in a quadtree split is 1, the decoder may split the current block into four sub-blocks. When QTSplitFlag is 0, the decoder may not parse additional split information (i.e., a binary tree split).

Embodiment 3

The present embodiment proposes a fast-decision method of a block split structure through the quadtree split of a square block split in a binary tree structure.

The encoder/decoder can reduce bits signaled from the encoder to the decoder and enables a subdivided split by splitting a square block, split in a binary tree structure, in a quadtree.

In one embodiment of the present invention, the encoder/decoder can reduce complexity on the encoder/decoder side and reduce bits necessary to signal subdivided split information by splitting a square block, split using a binary tree structure, using only a quadtree structure. That is, the encoder/decoder may perform a quadtree split in a specific condition regardless of a maximum depth of a binary tree split.

A conventional QTBT structure is a level greatly exceeding the complexity of the existing HEVC and is in the stage in which this is recognized as a problem and complexity is improved or the trade-off point of complexity versus maximum compression performance is researched. Such a problem can be solved through the present embodiment.

FIGS. 24 to 28 are embodiments to which the present invention is applied and are diagrams illustrating a fast decision method of a split mode.

Referring to FIG. 24, a case where a current block is split into square blocks through two binary tree splits is assumed. In this case, the encoder/decoder may determine whether the current block will be split using a quadtree structure and terminate a split structure determination process for the current block by signaling/parsing a flag indicating a quadtree split regardless of a maximum depth of a binary tree split.

FIGS. 25 and 26 show a split structure determination process of the encoder according to a conventional QTBT structure when a maximum depth of a binary tree split is 3.

The encoder may determine the best split structure for minimizing the rate-distortion cost by performing an RDO process on all prediction methods in three types of block structures, as shown in FIG. 25. After the best split structure is determined, the encoder may signal split information to the decoder, as shown in FIG. 26. If a binary tree split is not performed, split information of 1 bit may be signaled. If a binary tree split is performed, split information of 2 bits including a split mode may be signaled.

A split structure according to such a conventional QTBT structure may cause a great increase in complexity on the encoder side and may have a problem in that bits for representing split information are increased. This is described with reference to the following drawing.

Referring to FIGS. 27 and 28, the encoder may perform only a quadtree split on a square block split in a binary tree structure. The encoder may perform an RDO process only on two types of block structures because a binary tree split is not taken into consideration, as shown in FIG. 27. Accordingly, complexity on the encoder side can be significantly improved compared to a conventional QTBT structure.

Furthermore, as shown in FIG. 28, the encoder can reduce 1 bit per block compared to FIGS. 25 and 26 in which a binary tree split is performed because the encoder has only to signal only QTSplitFlag indicating whether a split will be performed using a quadtree structure.

A case where a maximum depth of a binary tree split is 3 has been described as an example. If a maximum depth of a binary tree split is greater than 3, the above-described complexity and signaling bits may be steeply increased. This is described with reference to the following drawings.

FIGS. 29 and 30 are embodiments to which the present invention is applied and are diagrams illustrating a fast decision method of a split mode.

Referring to FIG. 29(a), in a conventional QTBT structure, an RDO process must be performed on all additional split structure for each sub-block of a binary tree based on a maximum depth condition of a binary tree split. In contrast, referring to FIG. 29(b), the encoder may take into consideration only a quadtree split with respect to a square block split in a binary tree structure according to a method proposed in the present embodiment. Accordingly, complexity on the encoder side can be significantly improved.

In a conventional QTBT structure, if an additional subdivided split continues to be performed in the state in which a specific level of a split has been performed, a lot of additional split information may be necessary. The rate may be excessively increased, which may result in the degradation of compression performance of video. Accordingly, a square block split in a binary tree structure can be efficiently represented as subdivided areas, complexity can be improved and compression performance of video can be improved by taking into consideration only a quadtree split with respect to the square block.

FIG. 30 shows split information necessary when each split structure is selected in FIG. 29. In a conventional QTBT structure, if a split is performed based on a maximum depth of a binary tree split, the split is not performed in a binary tree structure, and split information of 2 bits or more may be necessary other than a case where a split decision process is terminated, as shown in FIG. 30(a). As the depth of a binary tree split (or a maximum depth of the binary tree split) increases, a large number of flag bits may be necessary to represent split information according to the conventional QTBT structure.

In contrast, if only a quadtree split is taken into consideration with respect to a square block split in a binary tree, the encoder may represent a split structure by signaling only QTSplitFlag, as shown in FIG. 30(b).

FIG. 31 is an embodiment to which the present invention is applied and is a flowchart showing a method of determining the split structure of a block.

The split structure determination method according to the present embodiment may be applied to the encoder and the decoder. The decoder is described as a basis, for convenience of description.

The decoder determines whether a current block satisfies a first condition (S3101). In this case, the current block may be a coding unit, a decoding block, a prediction unit, a prediction block, a transform block, a transform unit or the like. The first condition may be, for example, 1) whether the current block is greater than or equal to a minimum size of a quadtree block, 2) whether the width and height of the current block are the same (i.e., when the current block is a square block).

If, as a result of the determination at step S3101, the first condition is satisfied, the decoder parses QTSplitFlag (S3102).

the decoder determines whether a QTSplitFlag value parsed at step S3102 is 1 (S3103).

If, as a result of the determination at step S3103, the QTSplitFlag value is 1, the decoder fetches a decoding process (or decoding function) for determining a split structure while rounding a loop with respect to each block (or sub-block) having four lower depths split from the current block (S3104).

If, as a result of the determination at step S3103, the QTSplitFlag value is not 1, the decoder determines whether an isBTBlock value is 1 (S3105).

If, as a result of the determination at step S3105, the isBTBlock value is 1, the decoder terminates the split structure determination process of the current block.

If, as a result of the determination at step S3101, the first condition is not satisfied or if, as a result of the determination at step S3105, the isBTBlock value is not 1, the decoder determines whether a second condition is satisfied (S3106). The second condition may be, for example, whether the current depth of a binary tree split is smaller than a maximum depth of the binary tree split.

If, as a result of the determination at step S3106, the second condition is satisfied, the decoder parses BTSplitFlag (S3107).

The decoder determines whether the BTSplitFlag value parsed at step S3107 is 1 (S3108). When the BTSplitFlag value is 1, the decoder parses BTSplitMode (S3109). The decoder sets the isBTBlock value to 1 and increases the current depth of the binary tree split by 1 (S3110).

The decoder fetches a decoding function for determining a split structure while rounding a loop with respect to each block (or sub-block) having two lower depths split from the current block (S3111). When the fetching of the decoding function is terminated with respect to the block having the two lower depths, the decoder terminates the split structure determination process of the current block. When the BTSplitFlag value is not 1 or if, as a result of the determination at step S3106, the second condition is not satisfied, the decoder terminates the split structure determination process of the current block.

That is, if the current block is a square block split in a binary tree structure, the decoder may determine a split structure of the current block by determining only whether the current block will be split in a quadtree. Furthermore, if a square block split in a binary tree structure has been split in a quadtree structure once, the decoder may not perform QTSplitFlag on the split square block. In other words, the decoder may perform the quadtree split on the square block, split in the binary tree structure, once, and may terminate a split structure determination process. In this case, prior to step S3102, the step of determining whether a square block split in a binary tree structure already corresponds to a quadtree split block may be performed.

FIG. 32 is a diagram illustrating a video processing method according to an embodiment of the present invention.

The video processing method according to the present embodiment may be applied to the encoder and the decoder. The decoder is described as a basis, for convenience of description.

The decoder decodes a first split flag indicating whether or not to split a first block using a binary tree structure (S3201). In this case, the first block may be a block split using a quadtree structure or may be a block split using a binary tree structure.

If the first block is a block split using the quadtree structure, the first block may correspond to a leaf node of a quadtree structure. In other words, step S3201 may include the step of decoding a third split flag indicating whether or not to split the first block using a quadtree structure. If the third split flag indicates that the first block will not be split, the decoder may decode the first split flag indicating whether or not to split the first block using the binary tree structure.

If the first split flag indicates that the first block will be split, the decoder may decode split mode information indicating the direction of the split (S3202). That is, when a first split flag value is 1, the decoder may decode split mode information in order to determine a vertical or horizontal split.

The decoder may confirm whether a second block split from the first block is a square block based on the split mode information (S3203).

If, as a result of the confirmation at step S3202, the second block is a square block, the decoder may decode a second split flag indicating whether or not to split the second block using a quadtree structure (S3204).

As described above, the decoder may split a square block, split in a binary tree structure, in a quadtree structure. In this case, the decoder can reduce signaled bits and enhance compression performance of video by splitting the square block, split in the binary tree structure, in the quadtree structure in a restricted condition. If the second split flag indicates that the second block will not be split, the decoder may decode a fourth split flag indicating whether or not to split the second block using a binary tree structure.

Furthermore, the decoder may split the square block, split in the binary tree structure, using only a quadtree structure. In this case, the decoder parses the second split flag indicating whether the square block will be split in a quadtree. If the second split flag indicates that the second block will not be split, the decoder may terminate the split decision process without parting the flag indicating whether the square block will be split in a quadtree. In other words, if the second split flag indicates that the second block will not be split, the decoder may determine the second block as a decoding block indicating a unit by which a decoding procedure is performed. Complexity can be improved and bits used to represent split information can be reduced by splitting a square block, split in a binary tree structure, using only a quadtree structure.

As described above, the decoder may split a square block, having a depth of a specific depth or more among blocks split using a binary tree structure, using a quadtree structure. That is, step S3240 may include the step of checking whether the current depth of a binary tree split of the second block is greater than or equal to a specific depth. In this case, the current depth of the binary tree split may be determined based on the root node (depth=0) of a binary tree.

Furthermore, if, as a result of the check, the current depth of the binary tree split is greater than or equal to the specific depth, the decoder may decode the second split flag. If, as a result of the check, the current depth of the binary tree split is smaller than the specific depth, the decoder may decode a fourth split flag indicating whether the second block will be split using a binary tree structure.

Furthermore, as described above, the specific depth may be determined based on a maximum depth of the binary tree split. In this case, the maximum depth of the binary tree split may be a preset value, and may be signaled in a sequence, picture, slice or block unit from the encoder.

Furthermore, as described above, the specific depth may be a value obtained by subtracting 1 or 2 from the maximum depth of the binary tree split. If a square block split in a binary tree structure is split in a quadtree block, the encoder/decoder may set a depth increment of a binary tree split to 1 or may set it to 2. Split information on a leaf node split in a quadtree structure may not be signaled by performing the quadtree split by taking into consideration the setting.

FIG. 33 is a diagram illustrating a block split structure determination apparatus according to an embodiment of the present invention.

FIG. 33 shows the block split structure determination apparatus in a single block form, for convenience of description, but the video processing apparatus may be implemented as an element included in the encoder and/or the decoder.

Referring to FIG. 33, the block split structure determination apparatus implements the functions, processes and/or methods proposed in FIGS. 5 to 32. Specifically, the block split structure determination apparatus may be configured to include a first split flag decoding unit 3301, a split mode decoding unit 3302, a second block confirmation unit 3303 and a second split flag decoding unit 3304.

The first split flag decoding unit 3301 decodes a first split flag indicating whether a first block will be split using a binary tree structure. In this case, the first block may be a block split using a quadtree structure and may be a block split using a binary tree structure.

If the first block may be a block split using the quadtree structure, the first block may correspond to a leaf node of the quadtree structure. In other words, the split structure determination apparatus may include a third split flag decoding unit for decoding a third split flag indicating whether the first block will be split using a quadtree structure. If the third split flag indicates that the first block will not be split, the first split flag decoding unit 3301 may decode the first split flag indicating whether the first block will be split using a binary tree structure.

The split mode decoding unit 3302 may decode split mode information indicating the direction of the split if the first split flag indicates that the first block will be split. That is, when the first split flag value is 1, the split mode decoding unit 3302 may decode split mode information in order to determine a vertical or horizontal split.

The second block confirmation unit 3303 may confirm whether a second block split from the first block is a square block based on the split mode information.

If, as a result of the confirmation, the second block is a square block, the second split flag decoding unit 3304 may decode a second split flag indicating whether the second block will be split using a quadtree structure.

As described above, the second split flag decoding unit 3304 may split a square block, split in a binary tree structure, in a quadtree structure. In this case, the decoder can reduce signaled bits and enhance compression performance of video by splitting the square block, split in the binary tree structure, in the quadtree structure in a restricted condition. If the second split flag indicates that the second block will not be slit, the decoder may decode a fourth split flag indicating whether the second block will be split using a binary tree structure.

Furthermore, the decoder may split the square block, split in the binary tree structure, using only a quadtree structure. In this case, the second split flag decoding unit 3304 parses the second split flag indicating whether the second block will be split in a quadtree. If the second split flag indicates that the second block will not be split, the decoder may terminate the split decision process without parsing the flag indicating whether the second block will be split in a binary tree. In other words, if the second split flag indicates that the second block will not be split, the second split flag decoding unit 3304 may determine the second block as a decoding block indicating a unit by which a decoding procedure is performed. Complexity can be improved and bits used to represent split information can be reduced by splitting a square block, split in a binary tree structure, using only a quadtree structure.

As described above, the decoder may split a square block, having a depth of a specific depth or more among blocks split using a binary tree structure, using a quadtree structure. That is, the second split flag decoding unit 3304 may confirm whether the current depth of a binary tree split of the second block is greater than or equal to a specific depth. In this case, the current depth of the binary tree split may be determined based on the root node (depth=0) of the binary tree.

Furthermore, if, as a result of the check, the current depth of the binary tree split is greater than or equal to the specific depth, the second split flag decoding unit 3304 may decode the second split flag. If, as a result of the check, the current depth of the binary tree split is smaller than the specific depth, the decoder may decode a fourth split flag indicating whether the second block will be split using a binary tree structure.

Furthermore, as described above, the specific depth may be determined based on a maximum depth of the binary tree split. In this case, the maximum depth of the binary tree split may be a preset value or may be signaled in a sequence, picture, slice or block unit from the encoder.

Furthermore, as described above, the specific depth may be a value obtained by subtracting 1 or 2 from the maximum depth of the binary tree split. If a square block split in a binary tree structure is split in a quadtree block, the encoder/decoder may set a depth increment of the binary tree split to 1 or 2. Split information on a leaf node split in a quadtree structure may not be signaled by performing a quadtree split by taking the setting into consideration.

In the aforementioned embodiments, the elements and characteristics of the present invention have been combined in specific forms. Each of the elements or characteristics may be considered to be optional unless explicitly described otherwise. Each of the elements or characteristics may be implemented in a form not combined with another element or characteristic. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

As described above, the preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of decoding video, comprising:
   decoding, by a processor, a first split flag indicating whether to split a first block using a binary tree structure;
   decoding, by a processor, split mode information indicating a direction of the split when the first split flag indicates the split of the first block;
   determining, by a processor, whether a second block split from the first block is a square block based on the split mode information; and
   decoding, by a processor, a second split flag indicating whether to split the second block using a quad-tree structure, as a result of the determination, when the second block is a square block,
   wherein decoding the second split flag comprises:
   checking whether a current depth of a binary tree split of the second block is greater than or equal to a specific depth, and
   decoding the second split flag when the current depth of the binary tree split is greater than or equal to the specific depth.

2. The method of claim 1,
   wherein the step of decoding the first split flag comprises a step of decoding a third split flag indicating whether to split the first block using a quad-tree structure, and
   wherein when the third split flag indicates that the first block is not to be split, the first split flag indicating whether to split the first block using the binary tree structure is decoded.

3. The method of claim 1, further comprising a step of:
   decoding a fourth split flag indicating whether to split the second block using a binary tree structure when the second split flag indicates that the second block is not to be split.

4. The method of claim 1, further comprising a step of:
   determining the second block is a decoding block indicating a unit for performing a decoding procedure when the second split flag indicates that the second block is not to be split.

5. The method of claim 1, further comprising a step of:
   decoding a fourth split flag indicating whether to split the second block using a binary tree structure when the current depth of the binary tree split is smaller than the specific depth.

6. The method of claim 1, wherein the specific depth is determined based on a maximum depth of the binary tree split.

7. The method of claim 1, wherein the specific depth is a value obtained by subtracting 1 or 2 from a maximum depth of the binary tree split.

8. The method of claim 6, wherein the maximum depth of the binary tree split is a preset value or signaled in a sequence, picture, slice or block unit from an encoder.

9. An apparatus for decoding video, comprising:
   a memory configured to store data for the video; and
   a processor coupled to the memory,
   wherein the processor is configured to:
   decode a first split flag indicating whether to split a first block using a binary tree structure;
   decode a split mode indicating a direction of the split when the first split flag indicates the split of the first block;
   confirm whether a second block split from the first block is a square block based on the split mode; and
   decode a second split flag indicating whether to split the second block using a quad-tree structure when the second block is a square block, and
   wherein the processor is configured to check whether a current depth of binary tree split of the second block is greater than or equal to a specific depth, and decode the second split flag when the current depth of the binary tree split is greater than or equal to the specific depth.

* * * * *